United States Patent
Katayama et al.

(10) Patent No.: US 8,184,198 B2
(45) Date of Patent: May 22, 2012

(54) IMAGE-TAKING APPARATUS HAVING OPTICAL VIEW FINDER AND AUTOFOCUS CAPABILITY

(75) Inventors: Toshio Katayama, Osaka (JP); Hisamo Sogawa, Hyogo (JP)

(73) Assignee: Sony Corporation (JP)

( * ) Notice: Subject to any disclaimer, the term of this patent is extended or adjusted under 35 U.S.C. 154(b) by 709 days.

(21) Appl. No.: 11/999,063

(22) Filed: Dec. 4, 2007

(65) Prior Publication Data

US 2008/0145043 A1    Jun. 19, 2008

(30) Foreign Application Priority Data

Dec. 19, 2006  (JP) ................ P2006-340912

(51) Int. Cl.
*G03B 13/00* (2006.01)
*H04N 5/222* (2006.01)

(52) U.S. Cl. .......... 348/346; 348/333.02; 348/333.09; 348/349; 348/351

(58) Field of Classification Search ........... 348/333.02, 348/333.03, 333.09

See application file for complete search history.

(56) References Cited

U.S. PATENT DOCUMENTS

| | | | | |
|---|---|---|---|---|
| 5,634,141 A * | 5/1997 | Akashi et al. | ........ | 396/51 |
| 6,670,992 B2 * | 12/2003 | Irie | ........ | 348/350 |
| 6,674,964 B2 * | 1/2004 | Irie | ........ | 396/51 |
| 7,414,664 B2 * | 8/2008 | Suda | ........ | 348/341 |
| 7,440,692 B2 * | 10/2008 | Okumura | ........ | 396/374 |
| 2005/0168621 A1 * | 8/2005 | Kageyama et al. | ........ | 348/349 |

FOREIGN PATENT DOCUMENTS

| | | |
|---|---|---|
| JP | 2002-207157 A | 7/2002 |
| JP | 2004-208028 A | 7/2004 |
| JP | 2005-221602 A | 8/2005 |
| JP | 2006-163094 A | 6/2006 |
| JP | 2006-323374 A | 11/2006 |

* cited by examiner

*Primary Examiner* — Ngoc-Yen Vu
(74) *Attorney, Agent, or Firm* — Lerner, David, Littenberg, Krumholz & Mentlik, LLP

(57) ABSTRACT

Disclosed herein is an image-taking apparatus including, a image pickup device, an optical viewfinder, focusing controlling means, display controlling means, setting means, and alarming means.

12 Claims, 16 Drawing Sheets

FIG. 7

| AF TYPE / AF AREA PATTERN | HYBRID AF CONTROL (HB) | PHASE-DIFFERENCE AF CONTROL (PT) | CONTRAST AF CONTROL (CR) |
|---|---|---|---|
| CENTER SPOT | ○ | ○ | ○ |
| WIDE | ○ | ○ | ○ |
| LOCAL | ○ | ○ | ○ |
| F SPOT | ○ | × | ○ |

«IMAGE-TAKING APPARATUS HAVING OPTICAL VIEW FINDER AND AUTOFOCUS CAPABILITY

CROSS-REFERENCE TO RELATED APPLICATIONS

The present application claims priority from Japanese Patent Application No. JP 2006-340912, filed in the Japanese Patent Office on Dec. 19, 2006, the entire content of which is incorporated herein by reference.

BACKGROUND OF THE INVENTION

1. Field of the Invention

The present invention relates to an image-taking apparatus.

2. Description of the Related Art

Known for the automatic focusing (AF) of digital cameras are a phase-difference AF control and contrast AF control.

Comparison between contrast AF control and phase-difference AF control is known to indicate that contrast AF control is higher in AF accuracy than phase-difference AF control while lower in focusing speed. Further, with phase-difference AF control, only a part of the imaging area based on an image pickup device can provide an AF area, while, with contrast AF control, of the imaging area based on an image pickup device, AF control can be made by use of the information obtained from an area at any given position.

Recently, technologies for executing focus control have been developed by use of the features of these AF techniques. For example, Japanese Patent Laid-open No. 2005-221602 proposes a technology in which, with an image-taking apparatus based on the above-mentioned two AF control techniques, one of the technique is selected in accordance with shooting situations.

SUMMARY OF THE INVENTION

As described above, contrast AF control allows automatic focusing by use of the information obtained from an area (or an AF area) at any given position within a shooting range. Hence, it becomes also practicable for an image-taking apparatus having a live-view function of sequentially displaying time-dependent images (or live-view images) associated with a subject captured by an image pickup device onto a display block, such as a back LCD panel, to have a mode (or a position specification mode) allowing the photographer to freely specify the position of an AF area.

However, in the above-mentioned position specification mode, the user can visually check the position of an AF area on the display block, but not on the display inside the optical viewfinder. Consequently, if switching is made from a framing (or an operation for determining a image composition) based on the display block to a framing based on the optical viewfinder, a problem occurs causing the photographer to hardly visually check the AF area in the position specification mode.

Therefore, the present invention addresses the above-identified and other problems associated with related-art methods and apparatuses and solves the addressed problems by providing an image-taking apparatus configured to achieve this object.

In carrying out the invention and according to one embodiment thereof, there is provided an image-taking apparatus. This image-taking apparatus is made up of a image pickup device configured to pick up an image of a subject of image taking; an optical viewfinder configured to visually recognizing the subject; focusing controlling means configured to control focusing on the basis of an image signal in an AF (Auto Focus) area inside the image pickup device; display controlling means configured to sequentially display time-dependent images of a subject image picked up by the image pickup device onto a display block and display position display indicative of a position of the AF area onto the time-dependent images in a superimposed manner; setting means configured to set whether to validate a position specification mode in which the position of the AF area to a given position inside an image-taking range based on the image pickup device; and alarming means configured to, when a command for switching from a first framing operation based on the display block to a second framing operation based on the optical viewfinder is issued with the position specification mode validated, issue a warning in response to the switching command.

In carrying out the invention and according to another embodiment thereof, there is provided an image-taking apparatus. This image-taking apparatus is made up of a image pickup device configured to pick up an image of a subject of image taking; an optical viewfinder configured to visually recognizing the subject; focusing controlling means configured to control focusing on the basis of an image signal in an AF area inside the image pickup device; display controlling means configured to sequentially display time-dependent images of a subject image picked up by the image pickup device onto a display block and display position display indicative of a position of the AF area onto the time-dependent images in a superimposed manner; setting means configured to set whether to validate at least one of a first AF area determination mode in which the position of the AF area can be specified to a given position inside an image-taking range based on the image pickup device and a second AF area determination mode in which at least one of candidate areas predetermined as candidates of the AF area can be determined as the focus area in the image-taking range; and a mode shifter configured to, when a command for switching from a first framing operation based on the display block to a second framing operation based on the optical viewfinder is issued with the first AF area determination mode validated, make transition from the first AF area determination mode to the second AF area determination mode in response to the switching command.

In carrying out the invention and according to still another embodiment thereof, there is provided an image-taking apparatus. This image-taking apparatus is made up of a image pickup device configured to pick up an image of a subject of image taking; an optical viewfinder configured to visually recognizing the subject; focusing controlling means configured to control focusing on the basis of an image signal in an AF area inside the image pickup device; display controlling means configured to sequentially display time-dependent images of a subject image picked up by the image pickup device onto a display block and display position display indicative of a position of the AF area onto the time-dependent images in a superimposed manner; setting means configured to set whether to validate a position specification mode in which the position of the AF area to a given position inside an image-taking range based on the image pickup device; and an AF are determiner configured to, when a command for switching from a first framing operation based on the display block to a second framing operation based on the optical viewfinder is issued with the position specification mode validated, determine a position of the AF area in response to the switching command.

As described and according to the invention, the inconvenience that, when a framing operation based on the display block is switched to a framing operation based on the optical viewfinder in the position specification mode, it comes difficult for the photographer to visually recognize the AF area in the position specification mode.

BRIEF DESCRIPTION OF THE DRAWINGS

FIG. 7 is a diagram illustrating a relationship between AF schemes and AF area patterns in the image-taking apparatus shown in FIG. 1;

DETAILED DESCRIPTION OF THE PREFERRED EMBODIMENTS

This invention will be described in further detail by way of embodiments thereof with reference to the accompanying drawings.

Embodiments of the Invention

<1. Configuration>

Figure 1:
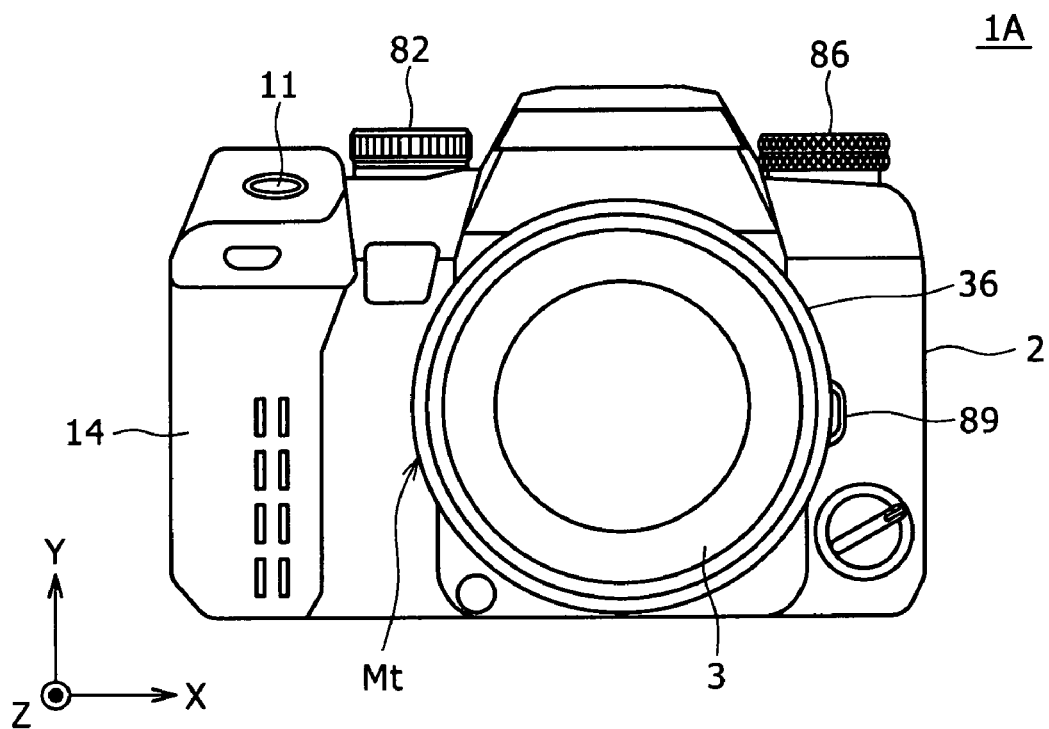
FIG. 1 is a top view illustrating an external configuration of an image-taking apparatus practiced as one embodiment of the invention.
Figure 2:
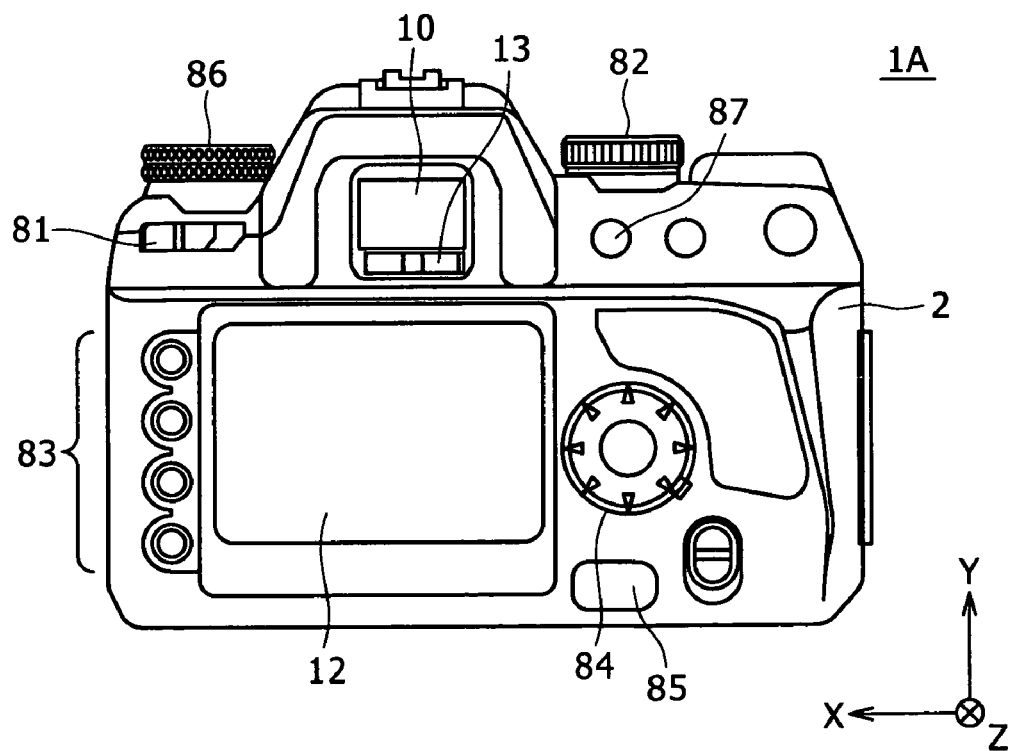
FIG. 2 is a rear view illustrating an external configuration of the image-taking apparatus shown in FIG. 1.

Now, referring to FIGS. 1 and 2, there are shown external views of an image-taking apparatus 1A practiced as one embodiment of the invention. FIG. 1 shows a top view of the image-taking apparatus 1A, while FIG. 2 shows a rear view thereof. This image-taking apparatus 1A is configured as a digital camera of changeable-single-lens reflex type.

As shown in FIG. 1, the image-taking apparatus 1A has a camera body 2. A changeable taking-lens unit 3 is detachably mounted on the camera body 2.

The taking-lens unit 3 is mainly configured by a lens barrel assembly 36, a lens group 37 (refer to FIG. 3) arranged inside the lens barrel assembly 36, and a diaphragm unit 33. The lens group 37 contains a focus lens 38 that is moved along the optical axis to change focal position.

The camera body 2 has a cylindrical mount Mt on which the taking-lens unit 3 is mounted at approximately the center of the camera body 2 and a lens mounting button 89 for mounting or dismounting the taking-lens unit 3 at a position near the cylindrical mount Mt.

In addition, the camera body 2 has a mode setting dial 82 at an upper left position as viewed from the front of the camera body 2 and a control value setting dial 86 at an upper right position as viewed from the front of the camera body 2. The mode setting dial 82 allows the selection of one of various camera operation modes (image-taking modes such as portrait taking mode, landscape taking mode, and continuous shooting mode, and reproduction mode for reproducing taken images). The control value setting dial 86 allows the setting of controls values in these image-taking modes.

Further, the camera body 2 has a grip 14 on the left end as viewed from the front by which the photographer (or the user) holds the camera. On top of the grip 14, a shutter release button 11 for triggering exposure is arranged. Inside the grip 14, a battery accommodation space and a memory card accommodation space are arranged. The battery accommodation space is configured to store four size AA batteries, for example, that supply power to the camera. The memory card accommodation space is configured such that a memory card, not shown, for recording imaged data is loaded.

The shutter release button 11 is a two-step detection button configured to detect two operating states, a half-press state (or S1 state) and full-press state (or S2 state). When the shutter release button 11 is half-pressed to be in the S1 state, preparatory operations for obtaining a still image for recording (a taken image) associated with a subject are executed (an AF control operation and an AE control operation, for example). When the shutter release button 11 is further pressed to be in the S2 state, operations of taking the image of the subject and processing the taken image are executed (namely, a sequence of operations including the exposure associated with the subject by use of an image pickup device 107 to be described later, predetermined processing operations on an image signal obtained by the exposure, and so on).

Referring to FIG. 2, a back monitor 12 is arranged on the rear side of the camera body 2 at an approximate center thereof. The back monitor 12 is made up of a color LCD (Liquid Crystal Display). The back monitor 12 is configured to display a menu screen for setting shooting conditions and, in the reproduction mode, a taken image recorded to a memory card, for example.

A main switch 81 is arranged at an upper left position to the back monitor 12. The main switch 81 is made up of a two-point slide switch. When the contact of this main switch is slid to "OFF" position at the left, the power to the camera is turned off; when the contact is slid to "ON" position at the right, the power is turned on.

A direction select key 84 and an AF select button 85 are arranged to the right side of the back monitor 12. The direction select key 84 is made up of a circular operator button that detects the pressures in four directions, up and down, left and right, and the pressures in four directions, upper left and upper right, and lower left and lower right. It should be noted that the direction select key 84 also detects the pressure applied through the push button arranged at the center thereof. The AF select button 85 detects a pressing operation to switch between the auto focus (AF) schemes of the image-taking apparatus 1A.

Arranged to the left side of the back monitor 12 is a setting button group 83 made up of a plurality of buttons for displaying a menu screen, deleting an image, and so on.

An optical viewfinder (OVF) 10 is arranged at approximately top center of the camera body 2. A subject image is led through the taking-lens unit 3 into the optical viewfinder 10. The photographer can visually recognize the subject through the optical viewfinder 10. To be more specific, the subject image transmitted through the taking-lens unit 3 is reflected upward by a mirror 103 (FIG. 3) into a pentaprism to be reflected into an eyepiece lens 106. The photographer visually recognizes this subject image through the eyepiece lens. Thus, the photographer can determine picture composition through the optical viewfinder 10. It should be noted that, in taking an image of subject, the mirror 103 obtains clear of the optical path of a subject image, letting the subject image obtains from the taking-lens unit 3 to the image pickup device 107 in synchronization with the releasing of a shutter unit 40 to provide a taken image (or image data) associated with the subject.

Below the optical viewfinder 10, an eyepiece sensor 13 is arranged. The eyepiece sensor 13 senses an object coming close; to be specific, the eyepiece sensor 13 senses whether the photographer uses the viewfinder.

To the right side of the optical viewfinder 10, a display mode select button 87 is arranged. Detecting a pressing operation, the display mode select button 87 determines whether to execute a picture composing operation (or framing) by means of the optical viewfinder or the back monitor 12, details thereof being described later.

Figure 3:
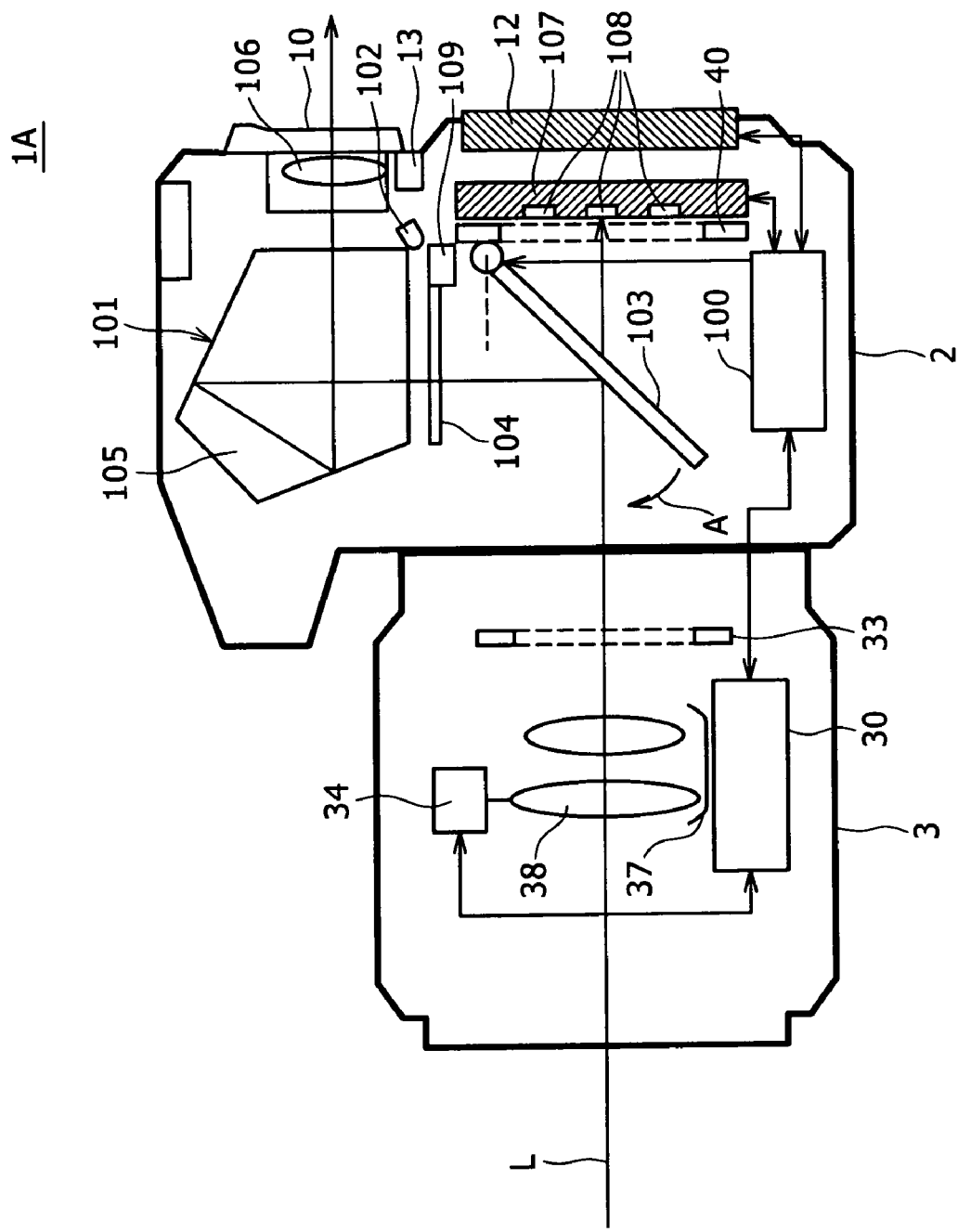
FIG. 3 is a cross sectional view of the image-taking apparatus shown in FIG. 1.

The following describes an internal configuration of the image-taking apparatus 1A. Referring to FIG. 3, there is shown a cross section of the image-taking apparatus 1A. As shown in FIG. 3, arranged inside the camera body 2 are an image pickup device 107, a viewfinder 101, a mirror 103, a shutter unit 40, and a camera control microprocessor 100.

The image pickup device (or the image sensor) 107 is arranged along optical axis L of the lens group 37 of the taking-lens unit 3 mounted on the image-taking apparatus 1A and on the plane vertical to optical axis L. The image pickup device 107 is made up of a CMOS color area sensor of Bayer array (hereafter also referred to simply as CMOS) in which a plurality of pixels each configured by a photo diode are two-dimensionally arranged in a matrix, color filters having different spectral properties, R (Red), G (Green), and B (Blue), for example, being arranged on the photo detecting surfaces of the pixels in a ratio of 1 (R) to 2 (G) to 1 (B), for example. The image pickup device 107 converts a subject image formed by the lens group 37 into analog electrical signals (or image signals) of R, G, and B, thereby outputting R, G, and B image signals.

The image pickup device 107 also has a photodetector element group 108 (hereafter simply referred to a phase difference sensor) for phase difference detection (or focal position detection), in addition to the photodetector element group for imaging. In the image-taking apparatus 1A, a focal position is detected on the basis of an output signal from the phase-difference sensor 108 to execute automatic focusing (or phase-difference AF control) based on phase-difference sensing.

The shutter unit 40 is arranged immediately in front of the image pickup device 107 along the optical axis thereof. The shutter unit 40 has a shutter curtain to provide a mechanical focal plane shutter that opens and shuts the optical path of a subject light (or a subject image) introduced to the image pickup device 107 along optical axis L.

Along the above-mentioned optical axis L, the mirror 103 (a semitransparent mirror or a half mirror) is arranged at a position where a subject light is reflected toward the viewfinder 101. Part of the subject light transmitted through the taking-lens unit 3 is reflected upward by the mirror 103 to be formed on a focusing glass 104. The other part of the subject light transmitted through the taking-lens unit 3 transmits this mirror 103. The transmitted subject light is received by the image pickup device 107, time-dependent images (or a live view) associated with the subject light being obtained by the image pickup device 107. Also, the transmitted subject light is received by the phase difference sensor 108 on the image pickup device 107 to be used for phase-difference AF control.

The viewfinder 101 has a pentaprism 105, the eyepiece lens 106, and a superimposed display device 102. The pentaprism 105, pentagonally shaped in cross section, converts a subject light entered from the bottom surface into an upright image by reflecting the subject light twice inside this prism. The eyepiece lens 106 introduces the subject light made upright by the pentaprism 105 into the outside optical viewfinder 10. The superimposed display device 102, made up of LEDs (Light Emitting Diodes) for example, forms superimposed display information on the subject light on the focusing glass 104 by lighting or blinking the information. The focusing glass 104 has an in-viewfinder display device 109 by which shooting information including shutter speed and aperture is attached to the subject image formed on the focusing glass 104. This configuration allows the viewfinder 101 to function as the optical viewfinder 10 for the photographer to visually check the field to be taken at the time of standby for shooting.

The mirror 103, configured as a so-called quick return mirror, retracts up in the direction of arrow A in FIG. 3 when exposure (main image taking) is made and remains below the focusing glass 104 (a mirror-up state). When exposure has been completed, the mirror 103 returns to the original position (shown in FIG. 3) (a mirror-down state).

In the mirror-up state in which the mirror 103 retracts from the optical path, the subject light image from the image-taking optical system is all formed on the image pickup device 107 to provide the main taken image.

On the other hand, in the mirror-down state in which the mirror 103 blocks the optical path, the subject image from the image-taking optical system is separated into two optical paths, a reflected optical path and a transmission optical path. The subject image separated into the transmission optical path is formed on the image pickup device 107. The subject image separated into the reflected optical path is introduced to a viewfinder optical system. In the mirror-down state, the photographer visually recognizes either the display in the optical viewfinder (also referred to as OVF display) or a live-view image (also referred to as LVF display) that is displayed on the back monitor 12 in a moving image manner, thereby executing a composition determining operation (also referred to as framing).

In the present embodiment, the state in which the back monitor 12 is usable as framing means is referred to as the LVF mode and the state in which the optical viewfinder 10 is usable as framing means is referred to as the OVF mode. The photographer can switch between the LVF mode and the OVF mode by pressing the display mode select button 87 or determining whether the optical viewfinder is in use or not as determined by the eyepiece sensor 13.

To be more specific, pressing the display mode select button 87 in the LVF mode shifts the mode from the LVF mode to the OVF mode. Therefore, in response to the pressing of the display mode select button 87 in the LVF mode, a command is issued for instructing the switching from a framing operation by use of the back monitor 12 to the a framing operation by use of the optical viewfinder 10.

It should be noted that, with the image-taking apparatus 1A, a half mirror is used for the mirror 103 and either OVF display and LVF display is available in the mirror-down state. Hence, it is fundamentally practicable for the photographer to visually recognize the subject image by use of the optical viewfinder 10 also in the LVF mode and by use of the back monitor 12 also in the OVF mode. However, in the present embodiment, the pressing of the display mode select button 87 is indicative of the intention of the photographer for executing framing by use of either OVF display or LVF display. The image-taking apparatus 1A regards the pressing of the display mode select button 87 in the LVF mode as the switching from the framing by use of the back monitor 12 to the framing by use of the optical viewfinder 10, thereby issuing a switching command in accordance with the switching operation done.

If it is determined that the optical viewfinder 10 is in use by the eyepiece sensor 13, the mode is switched to the OVF mode. Namely, the same switching command as above is issued in accordance with a result of the detection by the eyepiece sensor 13.

The camera control microprocessor 100 configures an overall control block 100a on the basis of a cooperation between the CPU that executes computation, the RAM providing a work area in which the computation is executed, and the ROM in which a control program and the image-taking apparatus 1A's setting information are stored, thereby totally controlling the operations of the image-taking apparatus 1A.

The taking-lens unit 3 has a lens control microprocessor 30, the diaphragm unit 33, and a focus drive 34, and a diaphragm drive not shown. The lens control microprocessor 30 transmits the optical property information of the taking-lens unit 3 (focal length, aperture stop, and so on) and/or status information (focus lens position, F number, and so on) to camera control microprocessor 100 and, at the same time, controls the focus drive 34 and a diaphragm drive, not shown.

The focus drive 34 appropriately drives the focus lens 38 incorporated in the lens group 37 along the optical axis. The diaphragm drive adjusts the aperture of the diaphragm unit 33 to a specified aperture value.

<2. Display Functions>

Figure 4:
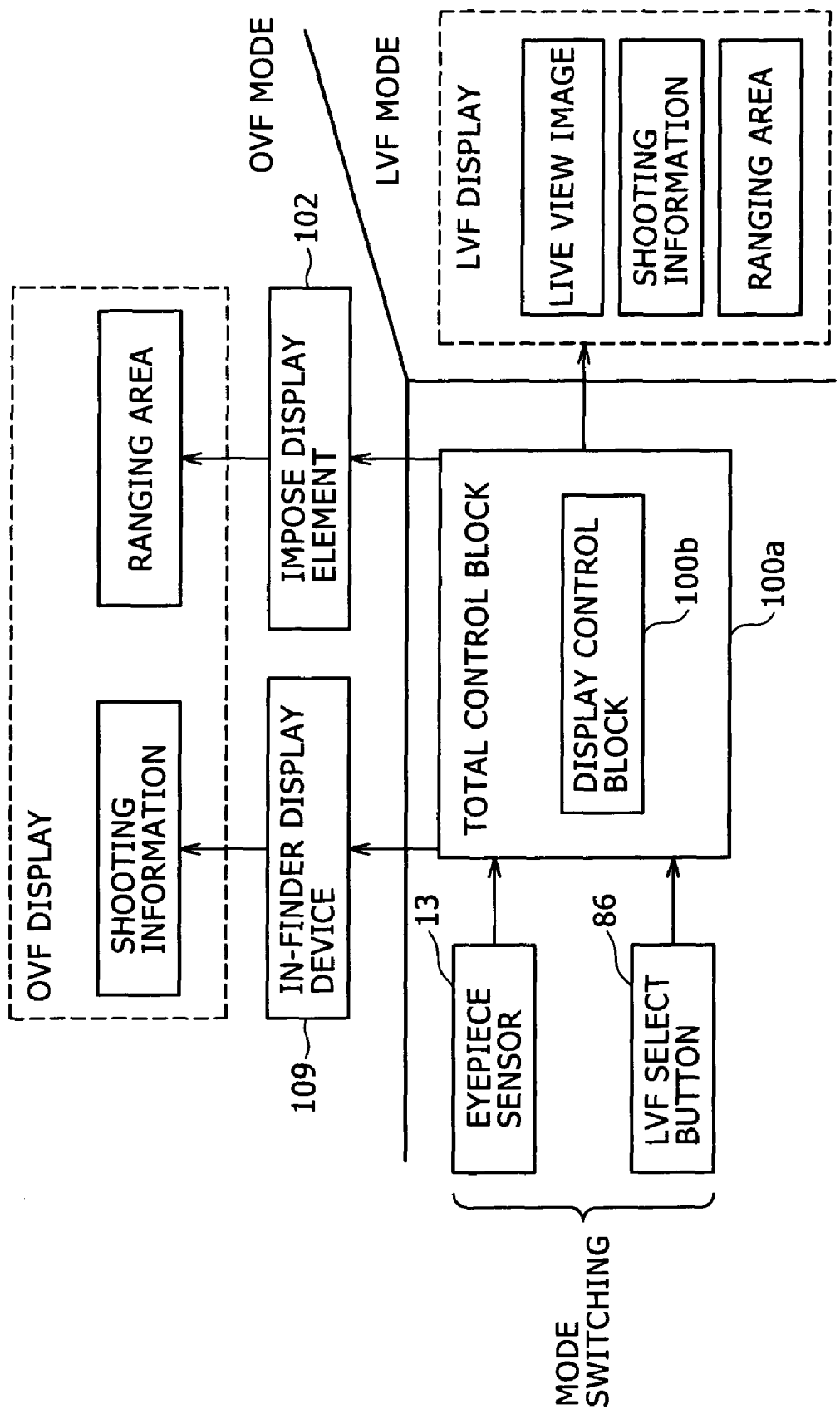
FIG. 4 is a block diagram illustrating an information display function of the image-taking apparatus shown in FIG. 1.
Figure 5:
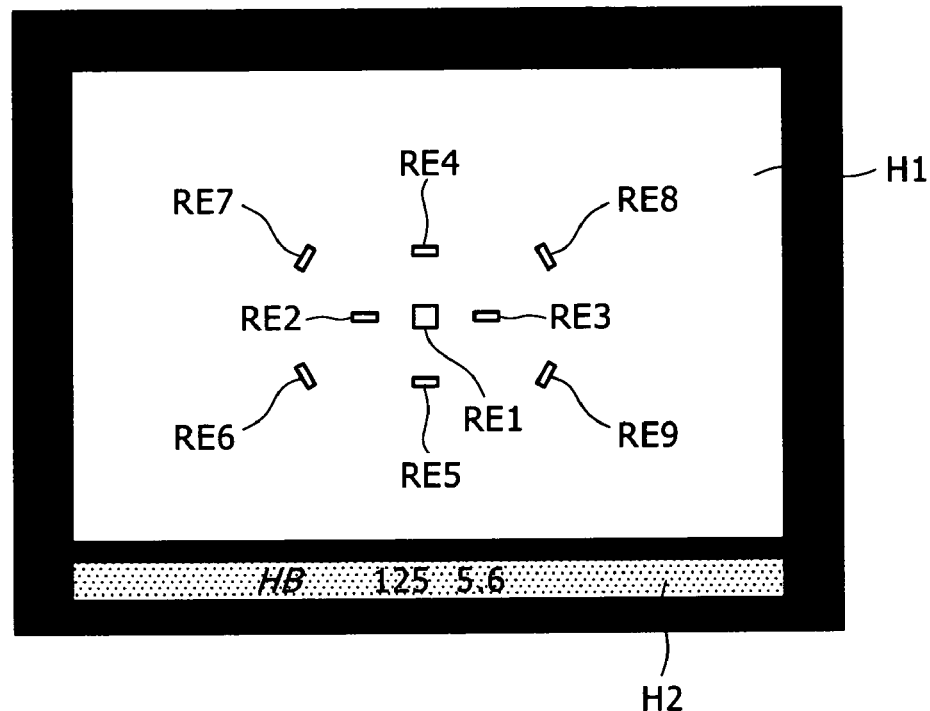
FIG. 5 is a diagram illustrating an OVF display screen inside an optical viewfinder.
Figure 6:
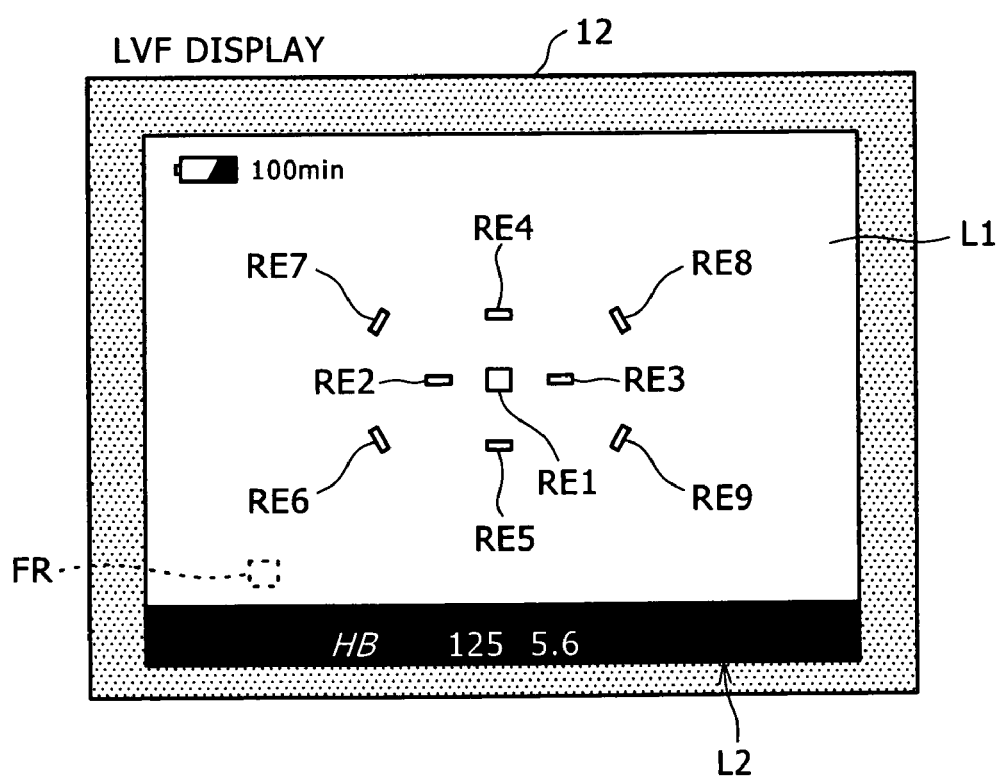
FIG. 6 is a diagram illustrating an LVF display screen on a back monitor.

The following describes the information display functions of the image-taking apparatus 1A. Referring to FIG. 4, there is shown a block diagram illustrating the information display function of the image-taking apparatus 1A. FIG. 5 shows an OVF display screen inside the optical viewfinder. FIG. 6 shows an LVF display screen on the back monitor 12. As shown in FIG. 5, nine white rectangles RE1 through RE9 scattered around the approximate center of a subject display area H1 are made visible by marking on the focusing glass 104, being representative of a ranging area for phase-difference AF control (or an area to be detected by the phase difference sensor 108).

As described above, the image-taking apparatus 1A allows the photographer to visually recognize either the OVF display inside the optical viewfinder or the LVF display on the back monitor 12, thereby executing framing.

To be more specific, if the photographer selects the OVF mode by operating the display mode select button 87 or by means of the eyepiece sensor 13 as shown in FIG. 4, the photographer can visually recognize the OVF display inside the optical viewfinder, thereby becoming ready for framing. The contents of the OVF display are controlled by the in-viewfinder display device 109 that is instructed by the overall control block 100a and the superimposed display device 102. To be more specific, image-taking information is additionally displayed in an image-taking information display box H2 below the subject display information area H1 by the in-viewfinder display device 109 (refer to FIG. 5). An AF area (to be described later) that is actually used for focusing becomes visually recognizable by the photographer by lighting or blinking the rectangles RE1 through RE9 in the subject display area H1 by the superimposed display device 102. It should be noted that the superimposed display device 102 is arranged for each of the rectangles RE1 through RE9.

On the other hand, if the photographer selects the LVF mode by operating the display mode select button 87 or by means of the eyepiece sensor 13, then the photographer can visually recognize the LVF display on the back monitor 12, becoming ready for framing. The operation of display on the back monitor 12 is controlled by a display control block 100b in the overall control block 100a. To be more specific, the display control block 100b sequentially displayed a plurality of images continuously obtained by the image pickup device 107 onto a live-view image display area L1 as a live-view image and, at the same time, the image-taking information into an image-taking information display area L2 below the live-view image display area L1 (refer to FIG. 6). The ranging areas RE1 through RE9 usable in phase-difference AF control are displayed on the live-view image in a superimposed manner.

<3. Auto Focusing>

The following describes auto focusing (AF) in the image-taking apparatus 1A. Referring to FIG. 7, there is shown a relationship between AF schemes and AF area patterns in the image-taking apparatus 1A. A circle in FIG. 7 is indicative that the combination between AF scheme and AF area pattern corresponding thereto is enabled, while a cross is indicative that the combination between AF scheme and AF area pattern corresponding thereto is disabled.

As shown in FIG. 7, the image-taking apparatus 1A can select one of auto focus schemes (or AF types); contrast AF control CR, phase-difference AF control PT, and hybrid AF control HB based on both the foregoing AF control schemes and executes the selected AF control.

In contrast AF control CR, an AF evaluation value is computed on the basis of an image signal supplied from the image pickup device 107 to drive the focus lens 38 to detect a position at which an AF evaluation value is maximized, thus executing focal adjustment. The AF evaluation value may be a sum of pixel value differences between adjacent pixels in each of images continuously obtained by the image pickup device 107 in a predetermined timed relation, for example.

In phase-difference AF control PT, a position (or a lens focused position) at which a subject focused state is achieved on the basis of a signal supplied from the phase difference sensor 108 associated with a predetermined ranging area is detected and the focus lens 38 is driven to the obtained lens focused position, thus executing focal adjustment.

In hybrid AF control HB, focusing is executed in a combination of the above-mentioned contrast AF control CR and phase-difference AF control PT. To be more specific, because contrast AF control CR is higher in AF accuracy than phase-difference AF control PT and phase-difference AF control PT is higher in focusing speed than contrast AF control CR, a coarse adjustment is first executed by phase-difference AF control PT and then a fine adjustment by contrast AF control CR in hybrid AF control HB.

One of these three types of AF schemes is selected by the photographer in principle by operating the selecting member. To be more specific, by operating the above-mentioned AF select button 85, the photographer selects a desired AF type.

As shown in FIG. 7, the image-taking apparatus 1A allows the photographer not only to select a desired AF type but also to change AF areas (or focus areas) to be used for focusing. AF area selecting patterns (or AF area determination modes) include center spot, wide, local, and F (Flexible) spot. It should be noted that the selection (or effectuation) of these AF area patterns and various operations to be executed in the selected AF area pattern are executed by button operations through the direction select key 84 and the setting button group 83.

In the center spot AF area pattern (or simply the center spot), the center ranging area RE1 is specified in a fixed manner in an area in which image taking is executed by the image pickup device 107 (refer to FIG. 6).

In the wide AF pattern (or simply "wide"), a plurality of ranging areas are specified as AF area candidates. In the main image taking, the ranging area of the specified two or more ranging areas that obtains the image of a subject nearest to the image-taking apparatus 1A on the basis of the principle of close proximity priority is determined as an AF area. For example, as shown in FIG. 6, if a plurality of ranging areas RE1, RE6, and RE7 are specified as AF area candidates, the ranging area that obtains the image of an subject nearest to the image-taking apparatus 1A is determined to be the AF area.

In the local AF pattern (or simply "local"), the photographer selects and specifies one the AF areas.

In the F spot AF pattern (or simply "F spot"), a predetermined F spot frame FR (also referred to as "predetermined area" or "ranging frame") is moved by the photographer inside the range of image taking to specify the position of AF area (refer to FIG. 6). Consequently, the F spot allows the execution of a focusing operation on the basis of the information obtained from the predetermined area FR at a given position inside the area of image taking. It should be noted that the F spot frame FR is the display (or the positional display) indicative of a position in the range of image taking of an AF area for use in focusing. Also, the F spot is expressed as a position specification mode because the F spot is a mode in which the photographer specifies the position of AF area.

The above-mentioned selection of AF areas based on center spot, wide, and local is executable in the LVF mode and the OVF mode. However, although the selection of an AF area based on F spot is executable in the LVF mode, this selection is not executable in the OVF mode.

To be more specific, in the AF area selection based on F spot, the photographer moves the F spot frame FR inside the image-taking range to specify the AF area. Therefore, in selecting an AF area based on F spot, it is desirable for the framing means to have a function (or a display function) of displaying a movable position display (the F spot FR in the present embodiment) in accordance with an instruction given by the photographer. However, in the OVF mode, the photographer executes framing by visually recognizing the OVF display inside the optical viewfinder, but the OVF display does not have the function of displaying the movable F spot frame FR in accordance with an instruction given by the photographer. The in-viewfinder display device 109 has a function of highlighting a predetermined particular area inside the optical viewfinder, but does not have a function of highlighting a given position inside the optical viewfinder. Although a method of arranging many superimposed display devices 102 in a matrix is possible as a means of improving display function of OVF display, this method is unrealistic because it is difficult to allocate a space for this arrangement.

Thus, in the OVF display, the display functions are limited as compared with the LVF display, so that the F spot frame FR cannot be displayed, thereby disabling the photographer to visually recognize the F spot frame FR. Namely, in the OVF mode, the execution of AF area selection based on F spot is difficult.

The following describes a relationship between AF type and AF area pattern. As shown in FIG. 7, the AF area patterns can be applied to any AF schemes in principle. However, in phase-difference AF control PT, the ranging area that may provide an AF area is limited in advance, so that the AF area selection based on F spot cannot be executed. Thus, in addition to the OVF mode, the AF area selection based on F spot is limited also in phase-difference AF control PT.

Figure 8:
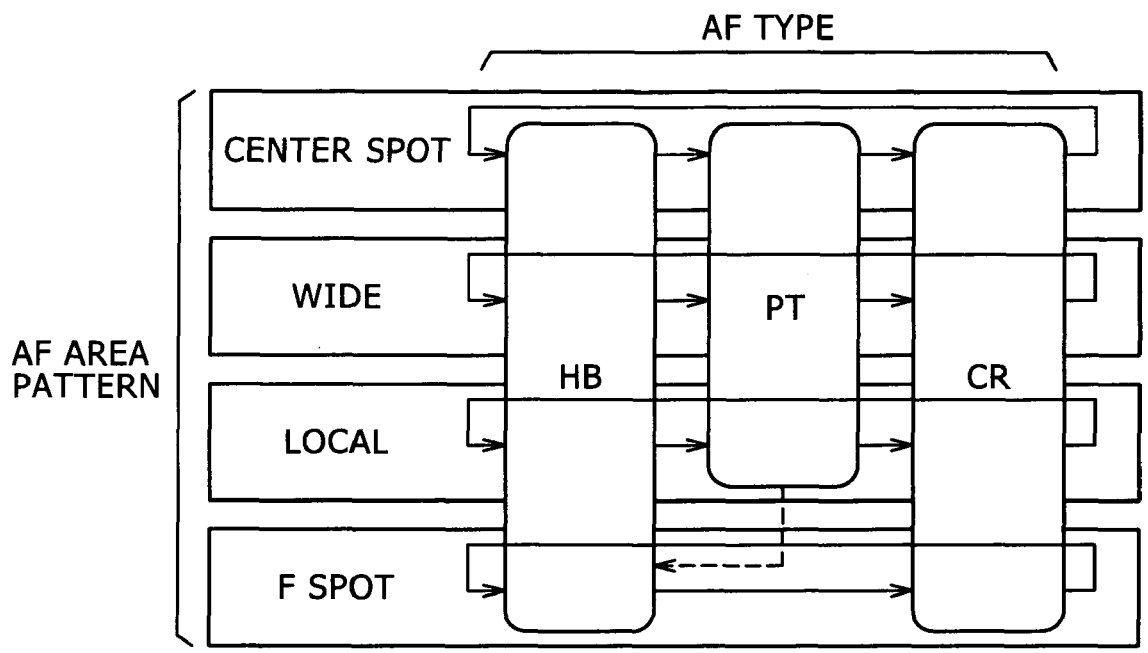
FIG. 8 is a status transition diagram associated with AF types and AF area patterns of the image-taking apparatus shown in FIG. 1.
Figure 9:
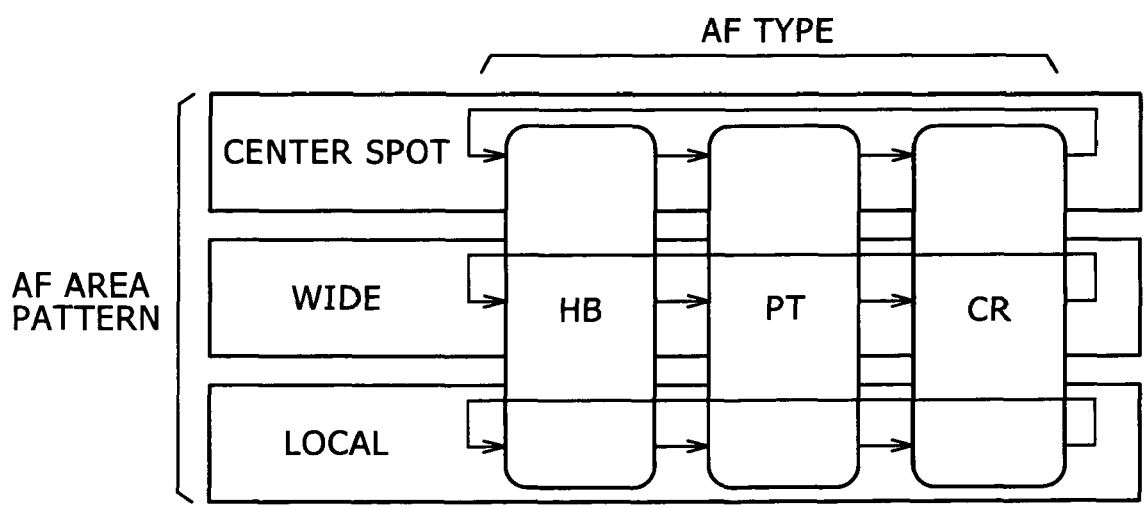
FIG. 9 is another status transition diagram associated with AF types and AF area patterns of the image-taking apparatus shown in FIG. 1.

This will specifically be described with reference to FIGS. 8 and 9. FIGS. 8 and 9 show status transition diagrams for the image-taking apparatus 1A with respect to AF types and AF area patterns. FIG. 8 shows a status transition in the LVF mode and FIG. 9 shows a status transition in the OVF mode. In these figures, each switching (or transition) between AF types is indicated by a solid-line arrow.

As shown in FIG. 8, in the LVF mode, the AF types are switched between cyclically in principle by means of a operating member (in this case, the AF select button 85). To be more specific, if an AF area pattern of center spot, wide, or local is selected in the LVF mode, the AF types cyclically shift to hybrid AF control HB to phase-difference AF control PT to contrast AF control CR to hybrid AF control HB in this order by switching operations. In contrast, if the AF area pattern of F spot is selected, phase-difference AF control PT cannot be used as AF type, so that AF types cyclically shift in the order of hybrid AF control HB to contrast AF control CR to hybrid AF control HB.

Further, the AF area patterns are switched between with AF type maintained in principle by switching operations through the operating member. To be more specific, if AF type, hybrid AF control HB or contrast AF control CR, is selected in the LVF mode, the AF area pattern can shift to one of center spot, wide, local and F spot by a switching operation. In contrast, if AF type of phase-difference AF control PT is selected, the AF area pattern can shift to one of center spot, wide or local by a switching operation, but not to F spot. This is because, in phase-difference AF control PT, ranging areas that can provide an AF area are predetermined as described above, the AF area pattern of F spot that allows the AF area to be changed to a given position within the range of image taking cannot be used. It should be noted that, in the present embodiment, if F spot is specified as an AF pattern with AF type phase-difference AF control PT selected, AF type automatically shifts from phase-difference AF control PT to hybrid AF control HB (as indicated by a dashed-line arrow in FIG. 8).

On the other hand, as shown in FIG. 9, the status transition in the OVF mode is substantially the same as the above-mentioned transition status in the LVF mode except that the AF area selection based on F spot cannot be executed.

To be more specific, AF types are cyclically switched between by the switching operation through the operating member (in this case, the AF select button 85). Namely, if the AF area pattern of center spot, wide, or local is selected in the OVF mode, the AF types cyclically shift from hybrid AF control HB to phase-difference AF control PT to contrast AF control CR to hybrid AF control HB in this order.

AF area patterns are switched between by the switching operation of the operating member with AF type maintained in principle. To be more specific, if hybrid AF control HB, phase-difference AF control PT, or contrast AF control CR is selected in the OVF mode, the AF area pattern shifts to one of center spot, wide, and local by the switching operation.

As described above, the comparison between the status transitions shown in FIGS. 8 and 9 indicates that, in the LVF mode, shift to the AF area pattern of F spot is enabled; in the OVF mode, however, shift to the AF area pattern of F spot is disabled because the display function of OVF display is limited.

Figure 10:
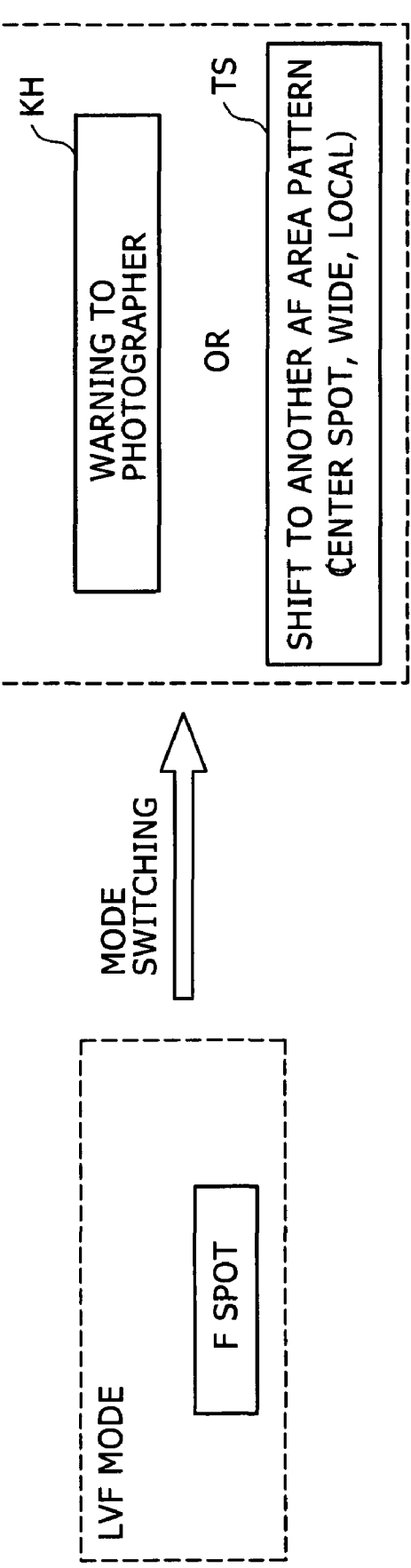
FIG. 10 is a diagram outlining an operation to be executed when mode switching takes place with an AF pattern of F spot selected in the LVF mode.

Assume here that mode switching is made through the display mode select button 87 or the eyepiece sensor 13 between the LVF mode and the OVF mode. Referring to FIG. 10, there is outlined an operation that is executed when mode switching takes place with AF area pattern of F spot selected in the LVF mode.

When switching is made from the OVF mode to the LVF mode, shift is made to the LVF mode with AF type and AF area pattern in the OVF mode maintained unchanged. Likewise, if switching is made to the OVF mode when the AF area pattern of center spot, wide, or local is selected in the LVF mode, shift is made to the OVF mode with AF type and AF area pattern maintained unchanged.

On the other hand, if switching to the OVF mode takes place with the AF area pattern of F spot selected in the LVF mode, no shift can be made with the AF type maintained unchanged, so that it is desired to execute some required processing.

Figure 11:
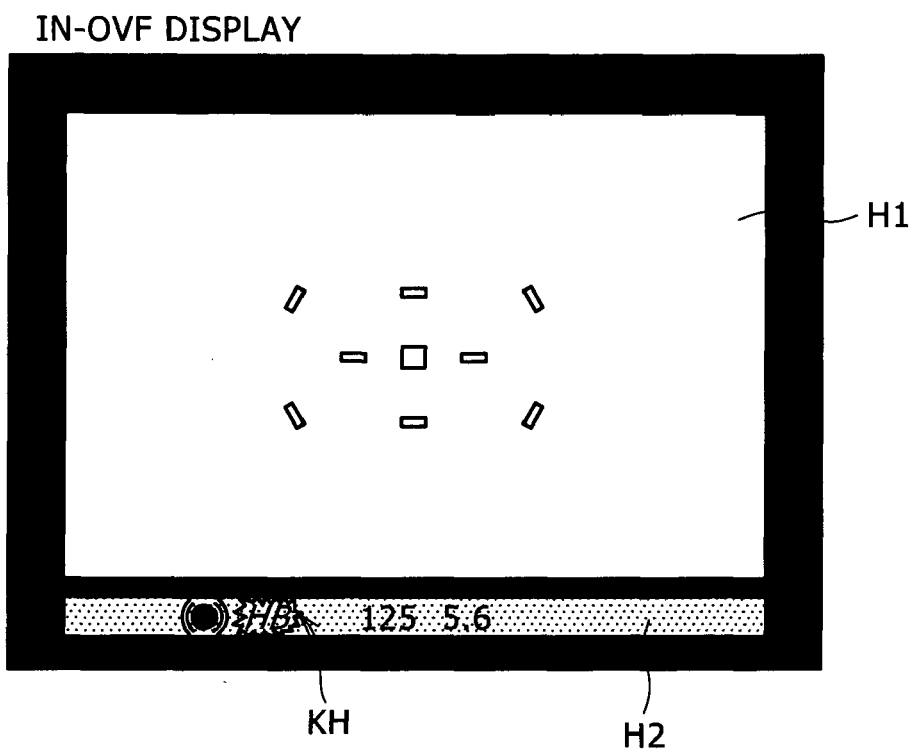
FIG. 11 is a diagram illustrating an alarm display screen inside the optical viewfinder.
Figure 12:
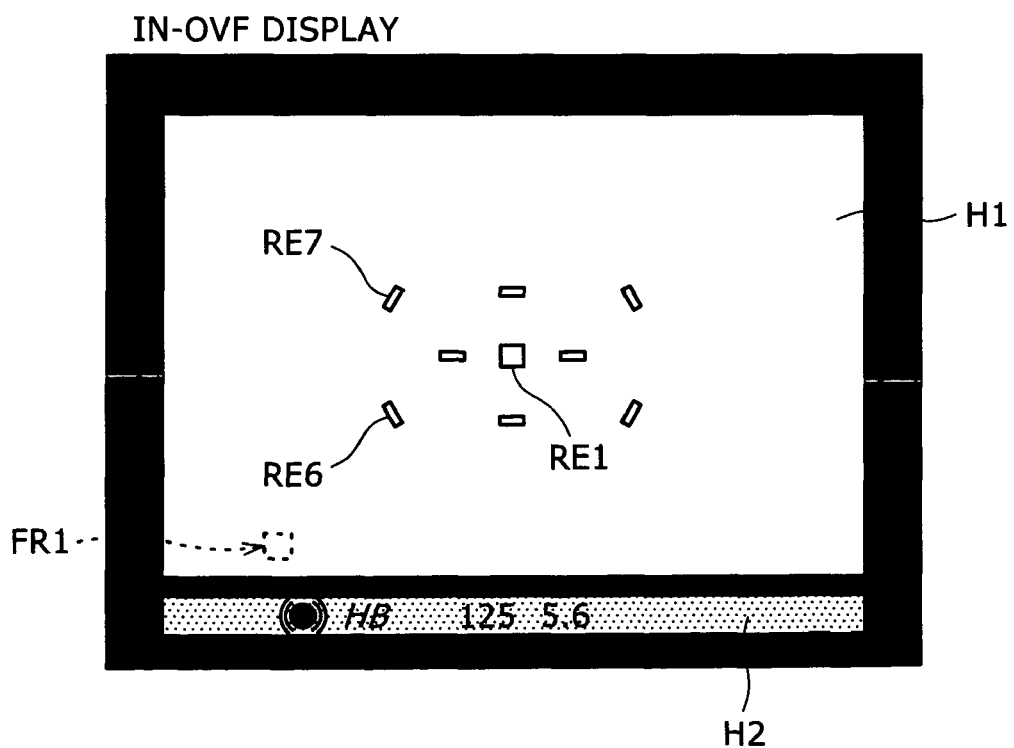
FIG. 12 is a diagram illustrating an OVF display screen inside the optical viewfinder.

In the image-taking apparatus 1A of the present embodiment, the above-mentioned required processing includes the warning KH to the photographer and the execution of transition TS to an AF area pattern other than F spot (refer to FIG. 10). It should be noted that which of the processing (giving warning KH to the photographer or transition TS to another AF area pattern) is to be executed when mode switching to the OVF mode takes place with the AF area pattern of F spot selected in the LVF mode is specified beforehand by the photographer by use of the direction select key 84 on the menu screen that is displayed when the setting button group 83 is operated. FIG. 11 shows warning display inside the optical viewfinder. FIG. 12 shows an example of OVF display inside the optical viewfinder. It should be noted that frame FRI shown in FIG. 12 is not actually shown in OVF display; it is shown for the purpose of description alone.

Warning KH to the photographer may be a warning display inside the optical viewfinder, for example. This warning display may be the blinking of the display ("HB" in the figure) of the current AF type shown in image-taking information display box H2 (refer to FIG. 11) or the displaying of a warning marker in image-taking information display box H2.

Thus, displaying a warning inside the OVF display when a mode switching to the OVF mode takes place with the AF area pattern of F spot selected in the LVF mode allows to notify the photographer of the selection of an AF area pattern that cannot be executed in the OVF mode. Upon warning, the photographer can take action, such as reselecting an AF area pattern, for example.

For transition TS to an AF area pattern other than F spot, a manner may be employed in which automatic transition is made from the AF area pattern of F spot to an AF area pattern predetermined by the photographer, of AF area patterns of center spot, wide and local other F spot in response to mode switching, for example. Of the three AF area patterns, at least one of detection areas (or candidate areas) predetermined as AF area candidates subject to the detection by the phase difference sensor 108 is determined as an AF area. To be more specific, when transition is made to the AF area pattern of center spot, the AF area becomes rectangle area RE1 (FIG. 5). When transition is made to the AF area pattern of wide, the photographer can select and specify a plurality of rectangular areas as AF area candidates. When transition is made to the AF area pattern of local, the photographer can select and specify one AF area from each rectangular area.

It is also practicable to employ a manner in which transition is made to the AF area pattern of local in a fixed manner to reflect the position of F spot frame FR in the LVF display prior to mode switching, thereby automatically determining an AF area. To be more specific, a rectangular area positioned nearest to F spot frame FR in the LVF display prior to mode switching is determined to be an AF area. For example, if the position of f spot frame FR (FIG. 6) in the LVF display prior to mode switching corresponds to the position of the frame FRI displayed in FIG. 12 in the OVF display, rectangular area RE6 that is nearest to this FRI is determined to be the AF area. It should be noted that frame FRI in FIG. 12 is virtually indicative of F spot frame FR in the LVF display prior to mode switching at the corresponding position in the OVF display; therefore, frame FRI is not actually shown in the OVF display.

In the present embodiment, switching is made as instructed by the photographer between the mode in which transition is automatically made to the AF area pattern predetermined by the photographer and the mode in which transition is made to the AF pattern of local in a fixed way to automatically determine an AF area.

Thus, determining the AF area in the OVF mode by reflecting the position of F spot frame FR in the LVF display prior to mode switching allows the photographer who has selected an AF area by use of F spot in the LVF mode to reflect photographer's intention.

As described above, transition to the AF area pattern other than F spot when mode switching to the OVF mode takes place with the AF area pattern of F spot selected in the LVF mode allows the correction of AF area pattern mismatches that may occur at the switching of display means.

<4. Operations>

Figure 13:
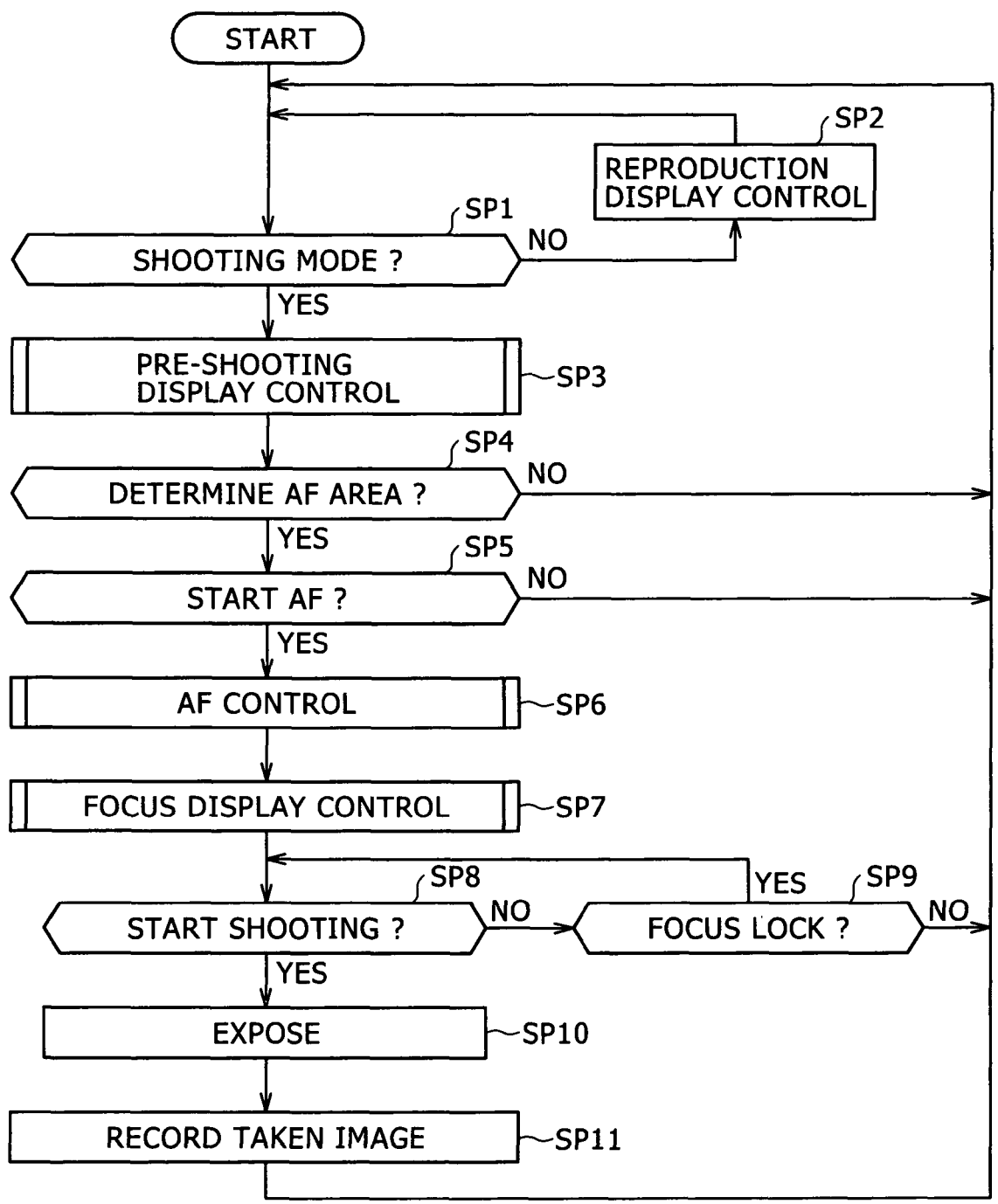
FIG. 13 is a flowchart indicative of an overall operation of the image-taking apparatus shown in FIG. 1.

The following describes operations of the image-taking apparatus 1A. FIG. 13 is a flowchart indicative of an overall operation of the image-taking apparatus 1A.

As shown in FIG. 13, when the power to the image-taking apparatus 1A is turned on by the operation of the main switch 81 for example, it is determined in step SP1 whether an image-taking mode is selected or not. If no image-taking mode is found selected, then the procedure goes to step SP2, in which an taken image recorded to a memory card is reproduced and displayed. On the other hand, if an image-taking mode is found selected, the procedure goes to step SP3.

In step SP3, display control prior to image taking is executed, details of which will be described later.

In step SP4, it is determined whether an AF area for use in automatic focusing has been selected or not. If this AF area is found selected, then the procedure goes to step SP5. Otherwise, the procedure returns to step SP1.

In step SP5, whether to start AF or not is determined on the basis of how the shutter release button 11 has been pressed. To be more specific, if the half-press state (or S1 state) of the shutter release button 11 is detected, then the procedure goes to step SP6; otherwise, the procedure returns to step SP1. Consequently, the processes of step SP1 through SP5 are repeatedly executed until the half-press state of the shutter release button 11 is detected.

In step SP6, focusing based on AF control is executed, details of which will be described later.

In step SP7, focus control is executed on the basis of a result of the AF control in step SP6, details of which will be described later.

In step SP8, whether to start image taking is determined on the basis of the pressing state of the shutter release button 11. To be more specific, if the full-press state (or S2 state) of the shutter release button 11 is detected, the procedure goes to step SP10; otherwise, the procedure goes to step SP9.

In step SP9, it is determined whether the half-press state of the shutter release button 11 continues. If the half-press state is found continuing, then the procedure returns to step SP8, in which a standby state is kept until a full-press state is detected. On the other hand, if the half-press state is found cleared, the procedure returns to step SP1.

In step SP10, an exposure operation is executed. To be more specific, a mirror-up state is entered in which an entire subject image is projected to the image pickup device 107, the image being exposed to the image pickup device 107.

In step SP11, a taken image obtained by the image pickup device 107 is recorded to the memory card.

Figure 14:
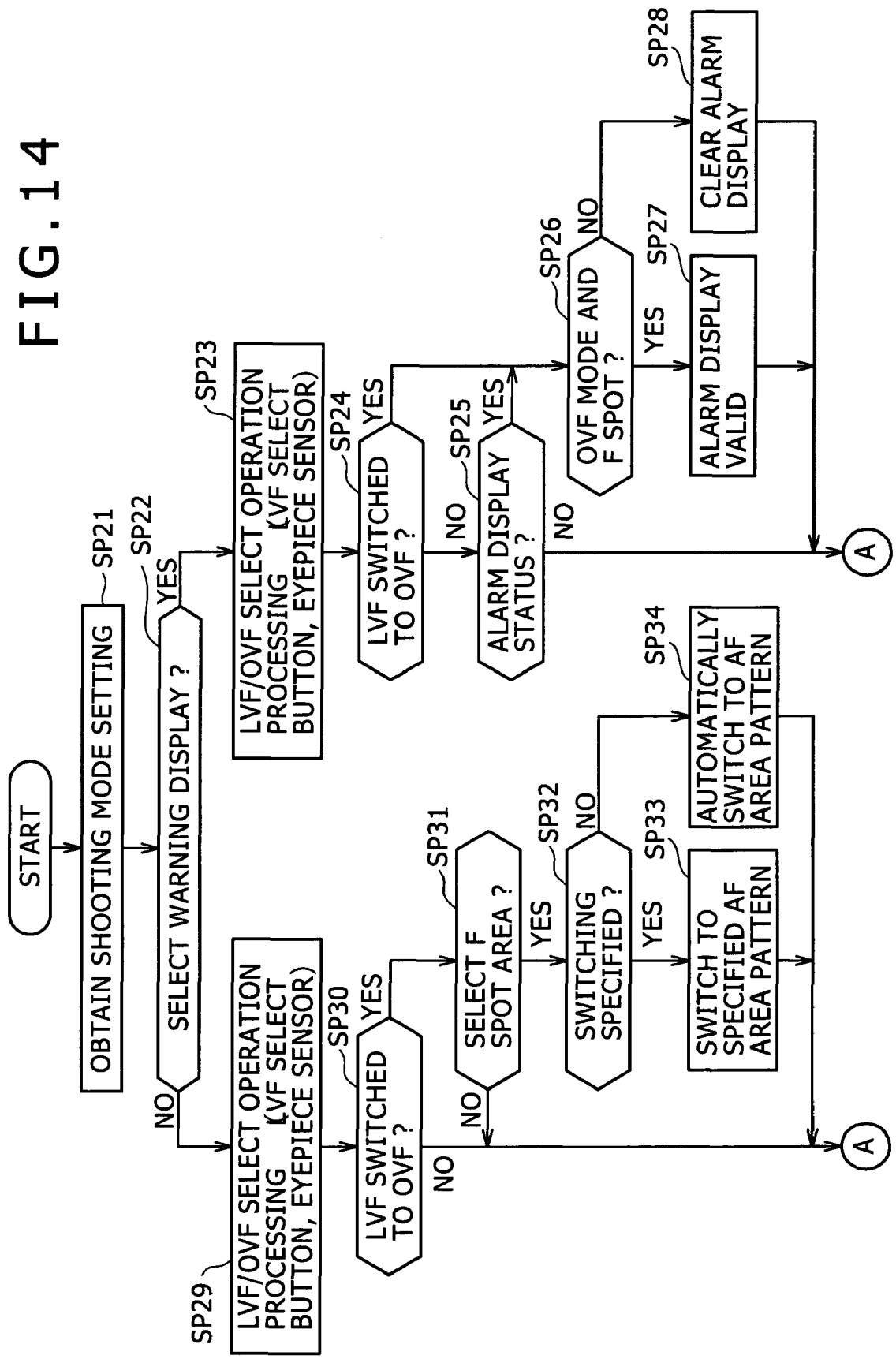
FIG. 14 is a subroutine indicative of display control to be executed before image taking.
Figure 15:
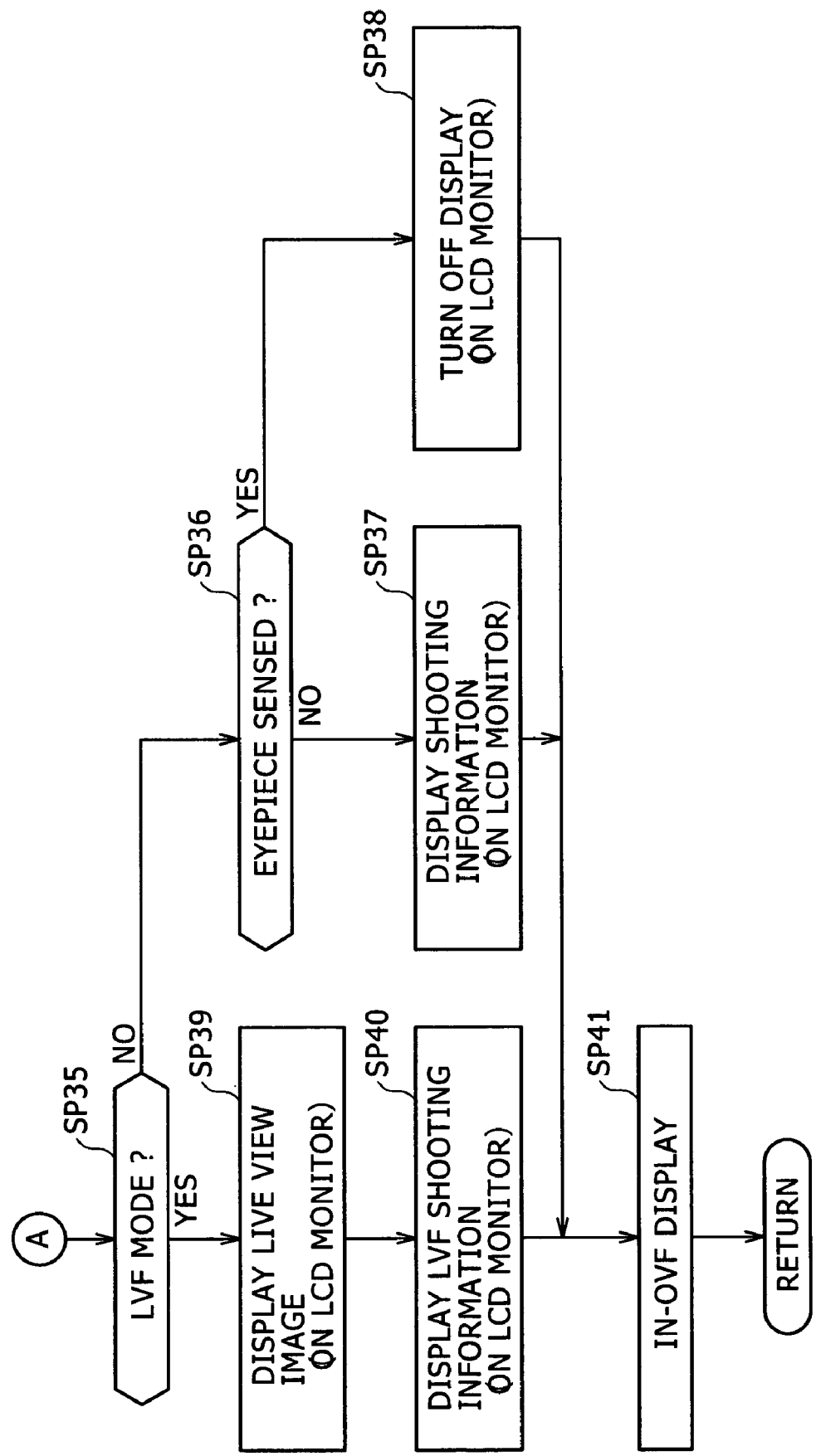
FIG. 15 is subroutine continued from the subroutine shown in FIG. 14.
Figure 16:
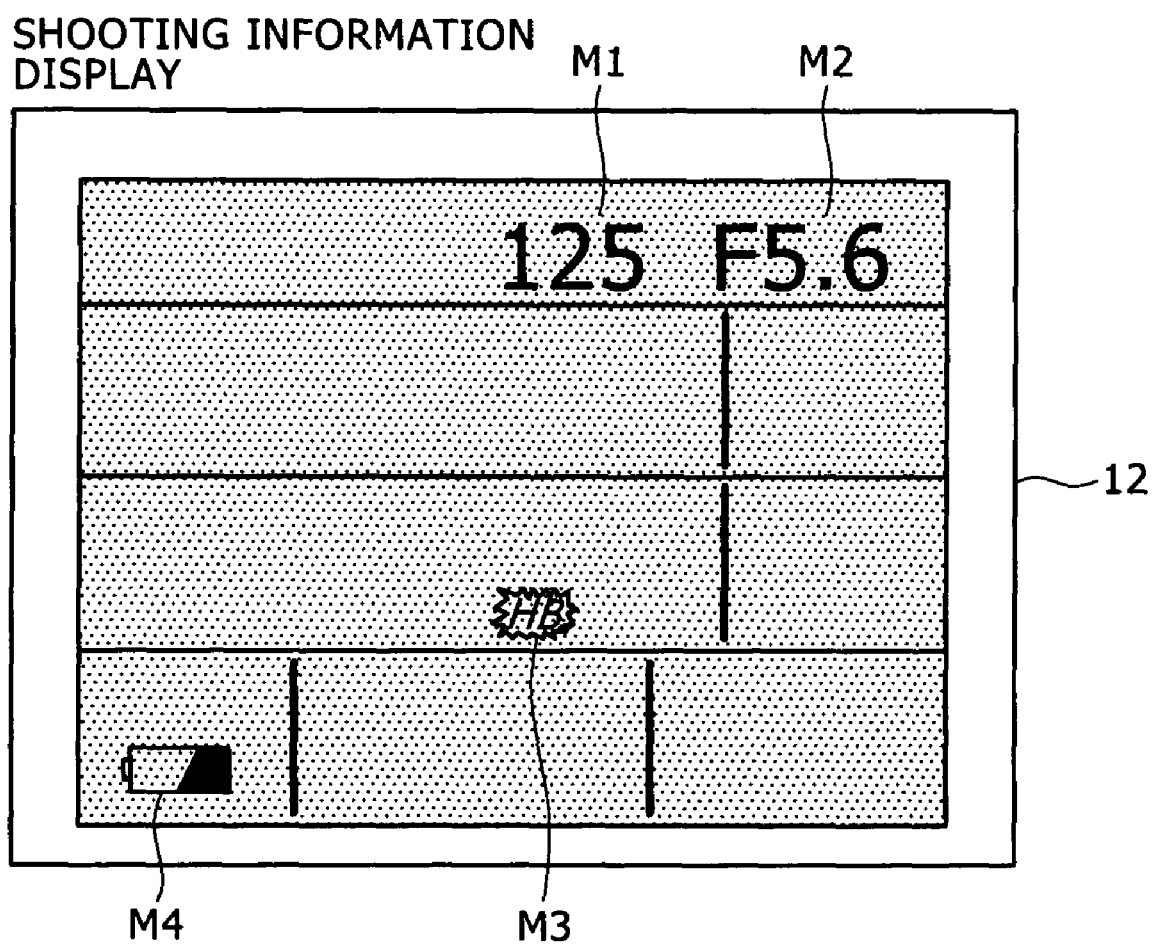
FIG. 16 is a diagram illustrating an image-taking information display on the back monitor.

The following describes in detail the operation to be executed in step SP3 above. FIGS. 14 and 15 are subroutines indicative of display control prior to image taking (pre-imaging display control in step SP3). FIG. 16 illustrates image-taking information shown on the back monitor 12.

In the pre-imaging display control process (step SP3), display control inside the optical viewfinder and on the back monitor 12 is executed. In steps SP21 through SP34 (FIG. 14), the processing to be executed when mode switching to the OVF mode takes place with the AF area pattern of F spot selected in the LVF mode is determined. In steps SP35 through SP41 (FIG. 15), display control of the back monitor 12 and display control of OVF display are executed.

To be more specific, as shown in FIG. 14, in step SP21, various settings (an aperture value and so on) of the image-taking apparatus 1A in the image-taking mode are obtained on the basis of the setting positions of operating members.

In step SP22, if mode switching to the OVF mode takes place with the AF area pattern of F spot selected in the LVF mode, it is determined whether the processing for displaying warning inside the optical viewfinder is selected or not. If this processing is found selected, the procedure goes to step SP23, in which the processes of steps SP23 through SP28 are executed. On the other hand, if the warning display processing is found not selected, the procedure goes to step SP29, in which the processes of steps SP29 through SP34 are executed. It should be noted that whether or not to execute the warning display processing is specified by the photographer in advance.

The following describes the case in which the warning display processing is found selected and the procedure goes to step SP23.

In step SP23, in accordance with the use of the viewfinder detected by the pressing of the display mode select button 87 or by the eyepiece sensor 13, one of the OVF mode and the LVF mode is selected.

In step SP24, it is determined whether the mode selection done in step SP23 is the switching from the LVF mode to the OVF mode. If the switching is found not to be from the LVF mode to the OVF mode, then the procedure goes to step SP25; if the switching is found to be from the LVF mode to the OVF mode, then the procedure goes to step SP26.

In step SP25, it is determined whether warning display is being executed inside the optical viewfinder. If warning display is found not being displayed in the optical viewfinder, then the procedure goes to step SP35 (FIG. 15); if warning display is found being displayed, the procedure goes to step SP26.

In step SP26, it is determined whether the OVF mode is selected and the AF area pattern of F spot is selected. If the conditions of step SP26 are satisfied, then the procedure goes to step SP27; otherwise, the procedure goes to step SP28.

In step SP27, it is determined to display a warning that the AF pattern (of F spot) that cannot be executed in the OVF mode is selected inside the optical viewfinder (namely, the validation of warning display). It should be noted that the actual warning display is executed in step SP37 or SP41 to be described later. On the other hand, in step SP28, the warning display inside the optical viewfinder is cleared (namely, the invalidation of warning display).

Thus, in the processes of steps S23 through S28, it is determined whether or not to execute a warning that the AF area pattern (of F spot) not executable in the OVF mode has been selected. If this warning has already been executed, it is determined whether or not to continue this warning. For example, if switching is made from the AF area pattern of F spot to another AF area pattern (step SP26) with the warning being executed (step SP25), this warning is cleared (step SP28).

The following describes the case in which the warning display processing is found not selected in step SP22 and the procedure goes to step SP29.

In step SP29, substantially the same processing as step SP23 is executed, one of the OVF mode and the LVF mode being selected.

In step SP30, substantially the same processing as step SP24 is executed to determine whether the mode selection in step SP29 is switching from the LVF mode to the OVF mode. If the switching is found not to be from the LVF mode to the OVF mode, then the procedure goes to step SP35; if the switching is found to be from the LVF mode to the OVF mode, the procedure goes to step SP31.

In step SP31, it is determined whether the AF area pattern of F spot has been selected. If the AF area pattern of F spot is found not selected, then the procedure goes to step SP35; if the AF area pattern of F spot is found selected, the procedure goes to step S32.

In step SP32, it is determined whether an AF area pattern switching (or transition) destination has been specified. If the destination is found, then the procedure goes to step SP33; otherwise, the procedure goes to step SP34. It should be noted that the specification of the switching destination is executed by the photographer prior to the execution of the processing (step SP33) by use of the direction select key 84 and so on the menu screen displayed by operating the setting button group 83. On the switching destination menu screen, not shown, a total of four options are shown; three AF area patterns other than the AF area pattern of F spot (to be more specific, the AF area patterns of center spot, wide, and local) and the AF area pattern of "no specification". The photographer selects one of these AF area patterns by use of the direction select key 84.

In step SP33, the AF area pattern of F spot is switched to the specified switching destination. For example, if the AF area pattern of center spot is specified as the switching destination, switching is made to the AF area pattern of center spot.

In step SP34, an AF area pattern is automatically determined. To be more specific, switching is made to a particular AF pattern in a fixed manner (in this case, the AF area pattern of local).

It is also practicable to make switching to the AF area pattern of local in a fixed manner and automatically determine an AF area. To be more specific, as described above, a rectangular area nearest to the position of the F spot frame FR in the LVF display prior to mode switching (for example, ranging area RE6 corresponding to the F spot frame FR shown in FIG. 6) may be determined as an AF area. Alternatively, from among the nine rectangular areas RE1 through RE9, the rectangular area stored in the ROM by the photographer may be determined as an AF area.

Thus, in the processes of steps SP29 through SP34, an AF area transition (or switching) is executed if mode switching to the OVF mode takes place with the AF area pattern of F spot selected in the LVF mode.

In step SP35 (FIG. 15), it is determined whether the LVF mode is selected or not. If the LVF mode is found not selected (namely, if the OVF mode is selected), then the procedure goes to step SP36.

In step SP36, it is determined eyepiece contact is detected by the eyepiece sensor 13. If eyepiece content is detected, the procedure goes to step SP38; otherwise, the procedure goes to step SP37.

In step SP37, image-taking information is shown on the back monitor 12 (refer to FIG. 16). As shown in FIG. 13, the image-taking information includes shutter speed display M1, aperture value display M2, AF type display M3, and battery level display M4, for example. If the execution of warning display was determined in the above-mentioned step SP27, then warning display may be outputted to the back monitor 12 in addition to the display of image-taking information. It should be noted that warning display may be executed by blinking AF type display M3, for example (refer to FIG. 16).

As described above, even if the OVF mode is selected, displaying image-taking information on the back monitor 12 by detecting that eyepiece contact is not made allows the photographer can obtain image-taking information and warning display from the back monitor 12.

In step SP38, eyepiece contact is found made, so that the display of the back monitor 12 turned off. Turning off the power to the display device not required by the photographer in terms of visual recognition can save the power dissipation.

On the other hand, if the LVF mode is found selected in SP35, then the procedure goes to step SP39.

In step SP39, an image captured from the image pickup device 107 is displayed as a live-view image on the back monitor 12.

In step S40, a rangeable area based on phase-difference AF control PT is displayed as superimposed on the live-view image and the image-taking information is attached thereto (refer to FIG. 6).

In step SP41, the image-taking information or the warning information is displayed by the in-viewfinder display device 109 into the optical viewfinder and the superimposition of the information is executed by the superimposed display device 102.

As described above, in the processes of steps SP35 through SP40, display control of the back monitor 12 is executed in accordance with the photographer's intention whether to use the back monitor 12 or the optical viewfinder 10 as the framing means. To be more specific, when the OVF mode is selected through the display mode select button 87 (step SP35), it is determined whether to display image-taking information (step SP37) or turn off the display (step SP38) in accordance with the use or no use of the optical viewfinder (step SP36). If the LVF mode is selected through the display mode select button 87 (step SP35), a live-view image and image-taking information are displayed on the back monitor 12 (steps SP39 and SP40). If the LVF mode is selected (step SP35) by the determination through the eyepiece sensor 13, the display on the back monitor 12 is turned off (steps SP36 and SP38).

As described above, in the pre-imaging display control process (step SP3), control of the display inside the optical viewfinder or on the back monitor 12 is executed on the basis of the specification by the photographer or the mode in which the image-taking apparatus 1A is used.

Figure 17:
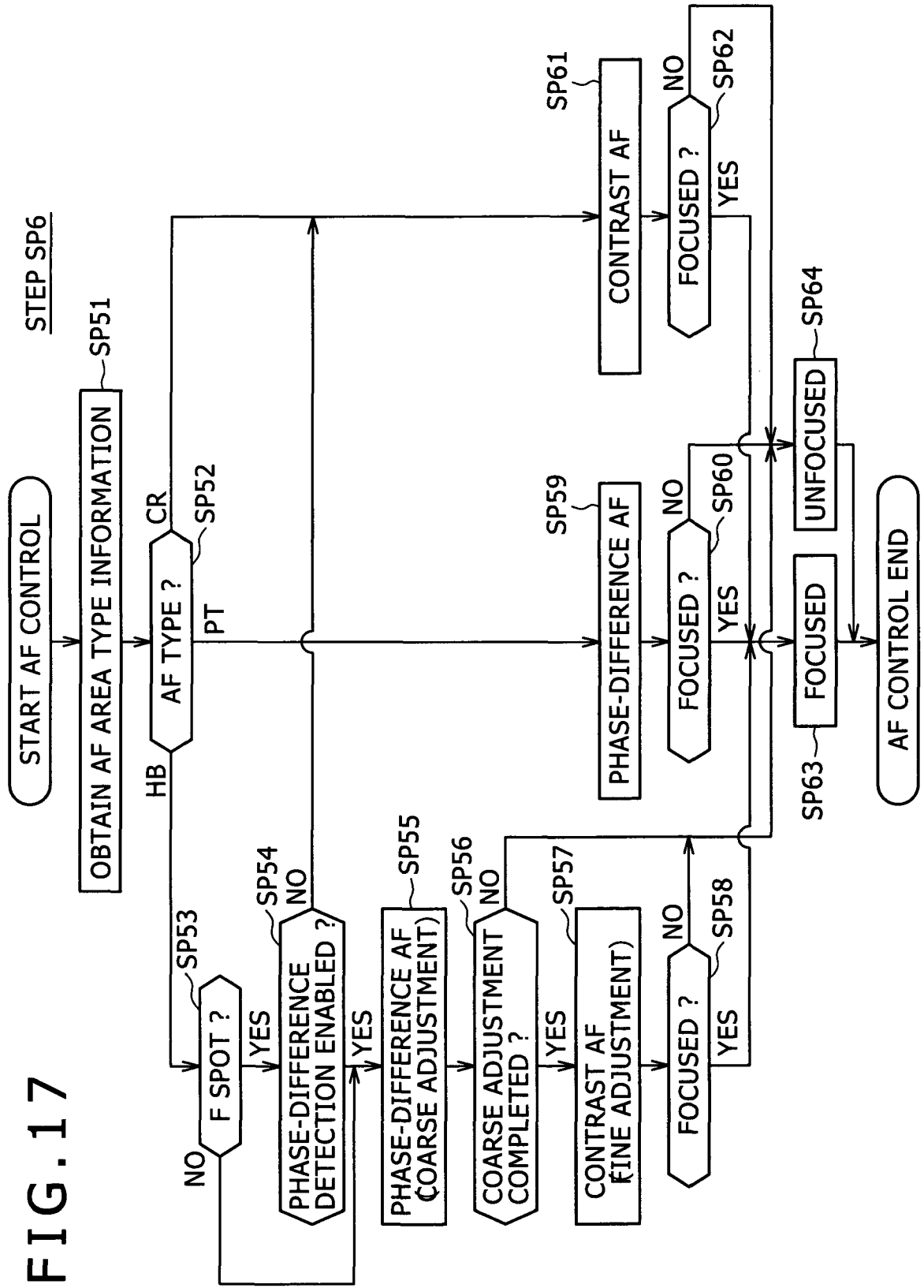
FIG. 17 is a subroutine indicative of AF control.

The following describes the operation of step SP6 in detail. In the AF control process (step SP6), focusing is executed on the basis of the specified AF type. FIG. 17 shows a subroutine of AF control (step SP6).

As shown in FIG. 17, AF type information and AF area pattern information are obtained in step SP51.

In step SP52, it is determined which AF type is selected. To be more specific, if hybrid AF control HB is selected, the procedure goes to step SP53, if phase-difference AF control PT is selected, the procedure goes to step SP59, and if contrast AF control CR is selected, the procedure goes to step SP61.

First, the case in which hybrid AF control HB is found selected will be described.

In step SP53, it is determined whether the AF area pattern of F spot is selected or not. If the AF area pattern of F spot is found not selected, the procedure goes to step SP55 by skipping step SP54. If the AF area pattern of F spot is found selected, the procedure goes to step SP54.

In step SP54, it is determined whether phase-difference AF control PT is enabled in the selectively specified F spot frame FR. To be more specific, it is determined whether the ranging area for phase-difference AF control PT is contained in the F spot frame FR selectively specified by the photographer. If the ranging area is not found, it indicates that the execution of phase-difference AF control PT in that F spot frame FR is disabled, so that the procedure goes to contrast AF control (step SP61). On the other hand, if the ranging area is found, the procedure goes to step SP55.

In step SP55, the coarse adjustment by phase-difference AF control PT is executed. To be more specific, a ranging operation based phase-difference AF is executed by use of an output signal supplied from the phase difference sensor 108 and, at the same time, the focus lens 38 is driven as required. This phase-difference detection is repeatedly executed and a defocus amount becomes below a predetermined level, it is determined that the coarse adjustment based on phase-difference AF control PT has been completed (step SP56).

If the coarse adjustment is found completed in step SP56, then the procedure goes to step SP57, in which the fine adjustment based on contrast AF control CR is executed. On the other hand, if no defocus amount on which the completion of the coarse adjustment is determined is not detected due to a low subject contrast or luminance, for example, it is determined to be out of focus (step SP64), thereby ending AF control.

In step SP57, contrast AF control CR is executed by driving the focus lens 38 in a predetermined lens position range around an estimated focusing position detected by the coarse adjustment based on phase-difference AF control PT. Then, if a position at which the AF evaluation value is maximized is detected, it is determined that focusing is successful (step SP58), upon which the procedure goes to step SP63, thereby ending the AF control. if no position at which the AF evaluation value is maximized is detected, an out-of-focus state is determined (step SP64), upon which the procedure goes to step SP64, thereby ending the AF control.

The following describes the case in which phase-difference AF control PT is found selected in step SP52. As described above, if phase-difference AF control PT is found selected in step SP52, then the procedure goes to step SP59.

In step SP59, the above-described focusing based on phase-difference AF control PT is executed in a selected AF area. Then, in step SP60, it is determined whether a focused state has been detected. If a focused state is found detected, then the procedure goes to step SP63, thereby ending the AF control. On the other hand, if the focused state is found not detected in step SP60, then the procedure goes to step SP64, thereby ending the AF control as focusing disabled.

If contrast AF control CR is found selected in step SP52, then the procedure goes to step SP61.

In step SP61, contrast AF control CR based on an AF evaluation value is executed in the selected AF area. Then, if a position at which the AF evaluation value is maximized is detected, it is determined that focusing is successful (step SP62), upon which the procedure goes to step SP63, thereby ending the AF control. On the other hand, if no position at which the AF evaluation value is maximized is detected, it is determined that focusing has failed (step SP62), upon which the procedure goes to step SP64, thereby ending the AF control.

Thus, in the AF control process (step S6), the focusing adjustment based on the AF type specified in the specified AF area is executed.

Figure 18:
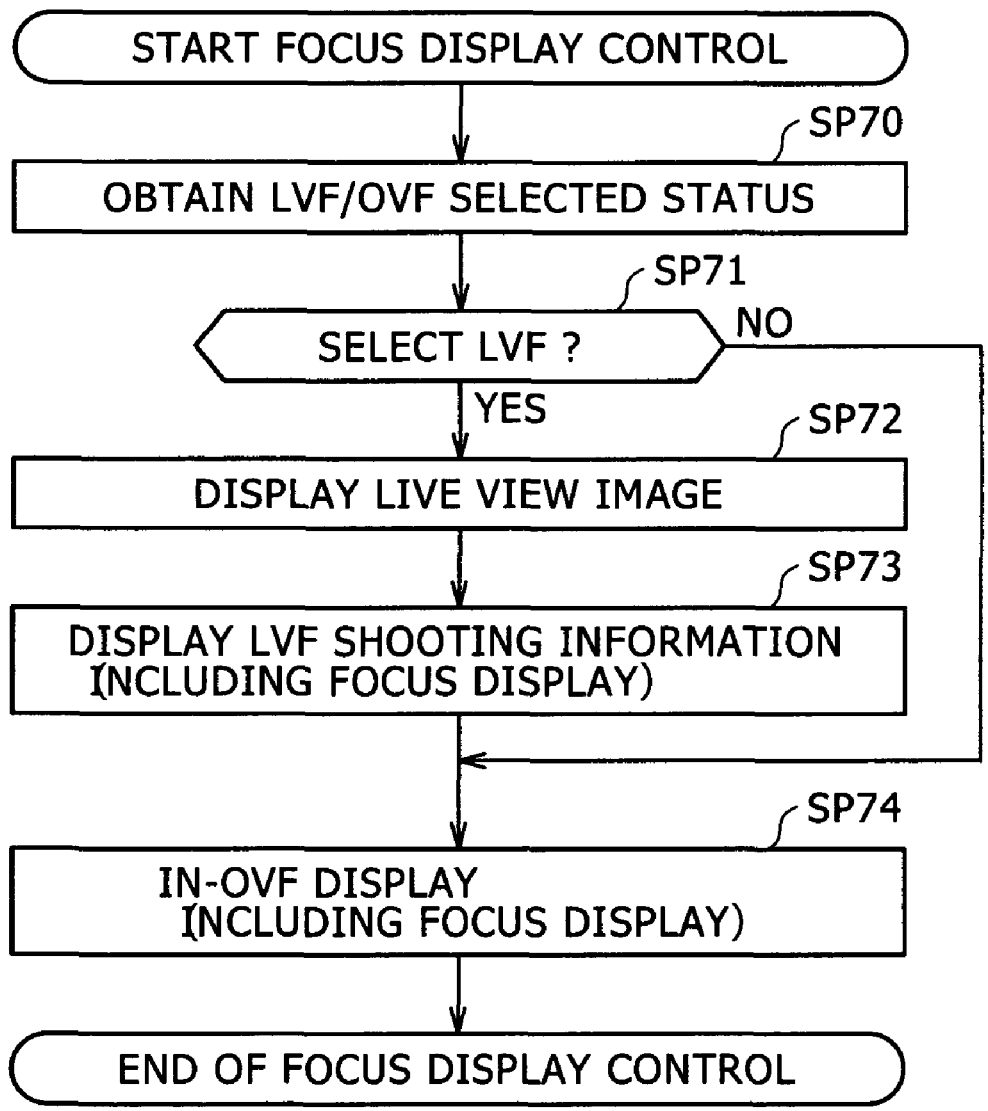
FIG. 18 is a subroutine indicative of focusing display control.
Figure 19:
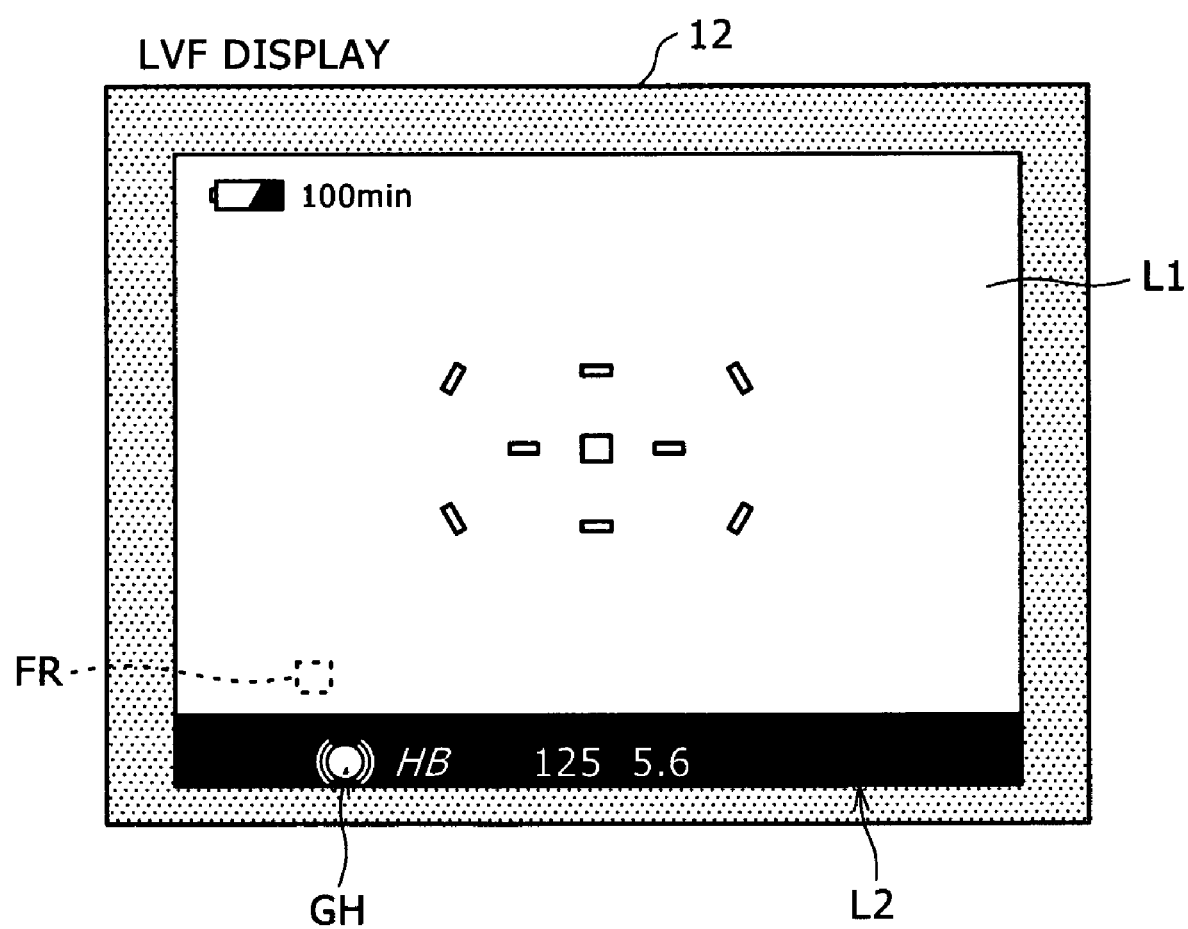
FIG. 19 is a diagram illustrating an LVF display screen on the back monitor.
Figure 20:
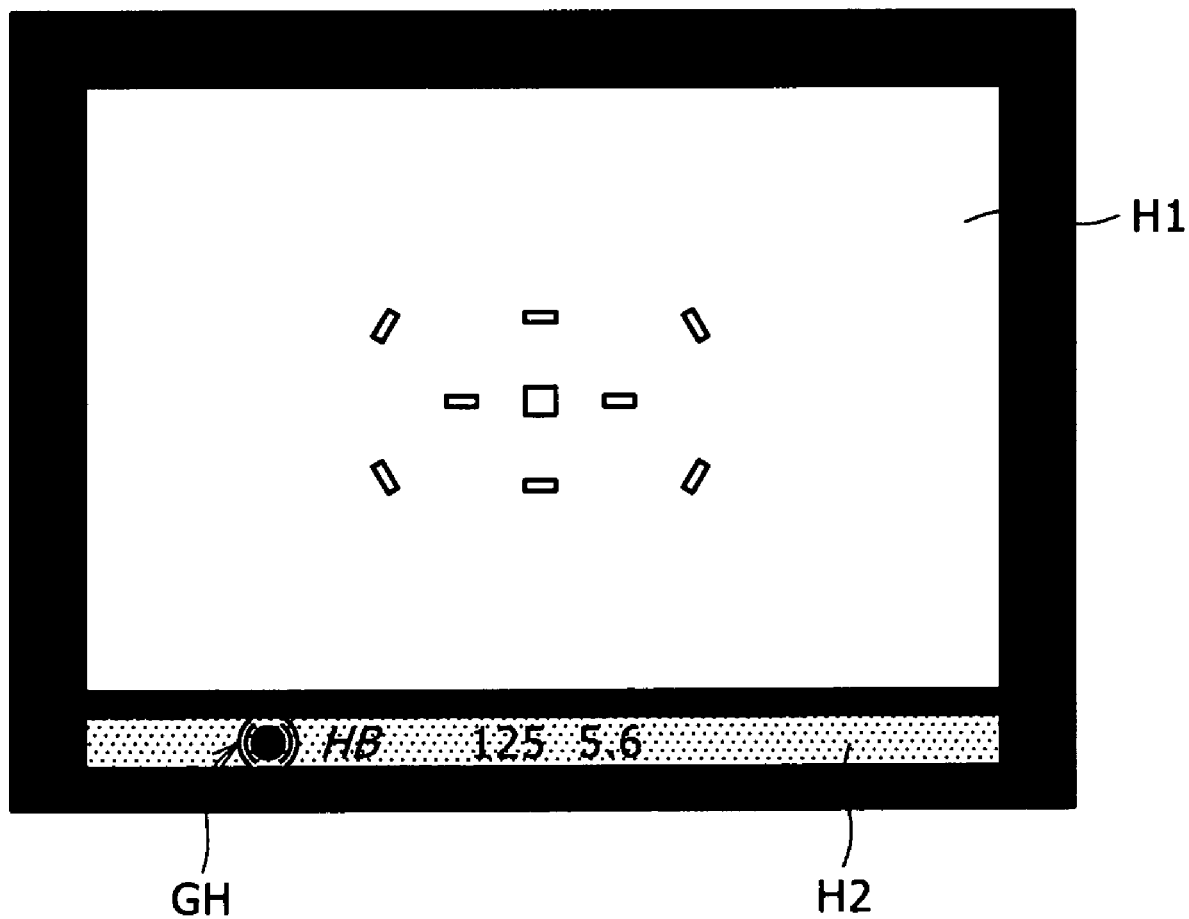
FIG. 20 is a diagram illustrating an OVF display screen inside the optical viewfinder.

The following describes the operation to be executed in the above-mentioned step SP7 in detail. In the focusing display process (step SP7), focusing display is executed on the back monitor 12 or inside the optical viewfinder so as to notify the photographer of successful focusing. FIG. 18 is a subroutine of focusing display control. FIG. 19 illustrates an LVF display screen on the back monitor 12. FIG. 20 illustrates an OVF display screen inside the optical viewfinder.

As shown in FIG. 18, in step SP70, the information indicative of which of the modes, the LVF mode and the OVF mode, is selected is obtained.

Then, in step SP71, it is determined whether the LVF mode is selected. IF the LVF mode is found selected, then the procedure goes to step SP72; if the LVF mode is found not selected, then the procedure goes to step SP74 by skipping steps SP72 and SP73.

In step SP72, an image captured from the image pickup device 107 is displayed on the back monitor 12 as a live-view image.

In step SP73, focusing display is shown on the back monitor 12 as image-taking information (FIG. 19). To be more specific, as shown in FIG. 19, focusing display GH is shown in image-taking information display box L2 of the back monitor 12.

In step SP74, focusing display GH is shown inside the optical viewfinder by the in-viewfinder display device 109 (refer to FIG. 20). To be more specific, as shown in FIG. 20, focusing display GH is shown in image-taking information display box H2 by the in-viewfinder display device 109.

Thus, in the focusing display control process (step SP7), focusing display indicative of a focused state has been achieved is shown on the back monitor 12 or the inside the optical viewfinder.

As described above, when a command for switching from the framing based on the back monitor 12 to the framing based on the optical viewfinder 10 is issued with the position specification mode validated for specifying the position of AF area to a given position inside the image-taking range based on the image pickup device 107 (step SP23), the image-taking apparatus 1A associated with the present embodiment gives a warning in response to that switching command (steps SP27, SP37, and SP41). This novel configuration can warn the photographer of the inconvenience that, if switching is made from the framing based on the back monitor 12 to the framing based on the optical viewfinder 10 is made with the position specification mode selected, it becomes difficult for the photographer to visually recognize the AF area based on that position specification mode.

If a command for switching from the framing based on the back monitor 12 to the framing based on the optical viewfinder 10 is issued with the position specification mode validated among the AF area determination modes (step SP29), the image-taking apparatus 1A shifts from the position specification mode to another AF area determination mode in response to that switching command (step SP33). This novel configuration minimizes the inconvenience that it becomes difficult for the photographer to visually recognize the AF area based on the position specification mode if switching is made from the framing based on the back monitor 12 to the framing based on the optical viewfinder 10 with the position specification mode selected.

If a command for switching from the framing based on the back monitor 12 to the framing based on the optical viewfinder 10 is issued with the position specification mode validated (step SP29), the image-taking apparatus 1A, in response to this switching command, determines, as the position of AF area, the position of the ranging area nearest to the position of position display in the position specification mode validated with the framing based on the optical viewfinder 10 executed from among ranging areas RE1 through RE9 predetermined as AF area candidates in the image-taking range (step SP34). This novel configuration minimizes the inconvenience that it becomes difficult for the photographer to visually recognize the AF area based on the position specification mode if switching is made from the framing based on the back monitor 12 to the framing based on the optical viewfinder 10 with the position specification mode selected.

Modifications

While preferred embodiments of the present invention have been described using specific terms, such description is for illustrative purpose only, and it is to be understood that changes and variations may be made without departing from the spirit or scope of the following claims.

For example, in the above-described embodiment, warning KH to the photographer is executed inside the optical viewfinder; however, it is also practicable to give this warning as an audible tone generated by the image-taking apparatus 1A.

In the above-described embodiment, LVF display is executed in the mirror-down state; however, it is also practicable to execute LVF display in the mirror-up state by switching between the mirror-down state and the mirror-up state in response to a command of switching between the OVF mode and the LVF mode.

In the above-described embodiment, warning KH to the photographer or transition TS to an AF area pattern other than that of F spot is selected in step SP22; however, it is also practicable to execute one of these options (namely, warning KH or transition TS) by skipping step SP22.

In the above-described embodiment, the AF pattern of local is employed as a particular AF area pattern in step SP34; however, it is also practicable to employ a manner in which transition is made to any one (the AF area pattern of center spot, for example) of the three AF area patterns except for the AF pattern of F spot in a fixed manner.

In the above-described embodiment, areas (or areas subject to detection) RE1 through RE9 subject to phase-difference detection are arranged on the image pickup device 107, for example. However, it is also practicable to separately arrange position sensors at positions outside the image pickup device 107 and that are optically equivalent to the positions of the areas RE1 through RE9, thereby detecting the degree of focusing of a light image in the area subject to detection on the image pickup device 107, for example.

The status transition patterns of the image-taking apparatus 1A shown in FIGS. 8 and 9 are illustrative only and therefore other status transition patterns may be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image-taking apparatus comprising:
an image pickup device configured to pick up an image of a subject of image taking;
an optical viewfinder configured to visually recognizing said subject;
an eyepiece sensor to detect when a user uses the optical viewfinder;
focusing controlling means configured to control focusing on the basis of an image signal in an auto focus area inside said image pickup device;
display controlling means configured to sequentially display time-dependent images of a subject image picked up by said image pickup device onto a display block and display position display indicative of a position of said auto focus area onto said time-dependent images in a superimposed manner;
setting means configured to set whether to validate a position specification mode in which the position of said auto focus area to a given position inside an image-taking range based on said image pickup device;
alarming means configured to, when a command for switching from a first framing operation based on said display block to a second framing operation based on said optical viewfinder is issued with said position specification mode validated, issue a warning in response to said switching command;
an in-viewfinder display device for displaying shooting information through the optical viewfinder by attaching the shooting information to an image formed on a focusing glass; and
a superimposed display device, for making an auto focus area that is actually used for focusing recognizable through the optical viewfinder by projecting light onto the image formed on the focusing glass.

2. The image-taking apparatus according to claim 1, wherein said alarm is warning display to be outputted into a viewing field of said optical viewfinder.

3. The image-taking apparatus according to claim 1, wherein said alarm is warning display to be outputted to said display block.

4. The image-taking apparatus according to claim 1, wherein said alarm is a warning tone to be generated by said image-taking apparatus.

5. The image-taking apparatus according to claim 1, wherein said switching command is issued in response to detection by said eyepiece sensor that the user uses the optical viewfinder.

6. The image-taking apparatus according to claim 1, wherein said switching command is issued in response to a specifying operation done through an operating member of said image-taking apparatus.

7. An image-taking apparatus comprising:
an image pickup device configured to pick up an image of a subject of image taking;
an optical viewfinder configured to visually recognizing said subject;
an eyepiece sensor to detect when a user uses the optical viewfinder;
focusing controlling means configured to control focusing on the basis of an image signal in an auto focus area inside said image pickup device;
display controlling means configured to sequentially display time-dependent images of a subject image picked up by said image pickup device onto a display block and display position display indicative of a position of said auto focus area onto said time-dependent images in a superimposed manner;
setting means configured to set whether to validate at least one of a first auto focus area determination mode in which the position of said auto focus area can be specified to a given position inside an image-taking range based on said image pickup device and a second auto focus area determination mode in which at least one of candidate areas predetermined as candidates of said auto focus area can be determined as said focus area in said image-taking range;
mode shifting means configured to, when a command for switching from a first framing operation based on said display block to a second framing operation based on said optical viewfinder is issued with said first auto focus area determination mode validated, make transition from said first auto focus area determination mode to said second auto focus area determination mode in response to said switching command;
an in-viewfinder display device for displaying shooting information through the optical viewfinder by attaching the shooting information to an image formed on a focusing glass; and
a superimposed display device for making an auto focus area that is actually used for focusing recognizable through the optical viewfinder by projecting light onto the image formed on the focusing glass.

8. The image-taking apparatus according to claim 7, wherein said switching command is issued in response to detection the eyepiece sensor that the user uses the optical viewfinder.

9. The image-taking apparatus according to claim 7, wherein said switching command is issued in response to a specifying operation done through an operating member of said image-taking apparatus.

10. An image-taking apparatus comprising:
an image pickup device configured to pick up an image of a subject of image taking;
an optical viewfinder configured to visually recognizing said subject;
an eyepiece sensor to detect when a user uses the optical viewfinder;
focusing controlling means configured to control focusing on the basis of an image signal in an auto focus area inside said image pickup device;
display controlling means configured to sequentially display time-dependent images of a subject image picked up by said image pickup device onto a display block and display position display indicative of a position of said auto focus area onto said time-dependent images in a superimposed manner;

setting means configured to set whether to validate a position specification mode in which the position of said auto focus area to a given position inside an image-taking range based on said image pickup device;

auto focus area determining means configured to, when a command for switching from a first framing operation based on said display block to a second framing operation based on said optical viewfinder is issued with said position specification mode validated, determine a position of said auto focus area in response to said switching command;

an in-viewfinder display device for displaying shooting information through the optical viewfinder by attaching the shooting information to an image formed on a focusing glass; and a superimposed display device for making an auto focus area that is actually used for focusing recognizable through the optical viewfinder by projecting light onto the image formed on the focusing glass.

11. The image-taking apparatus according to claim 10, wherein said auto focus area determining means determines, as the position of said auto focus area, a position of a candidate area nearest to the position of said position display in said position specification mode validated with said first framing operation executed from among the candidate areas predetermined as candidates of said auto focus area in said image-taking range.

12. The image-taking apparatus according to claim 11, wherein said auto focus area determining means determines, as said auto focus area, said predetermined candidate area from among said candidate areas predetermined as the candidates of said auto focus area in said image-taking range.

* * * * *